US006933627B2

(12) United States Patent
Wilhelm

(10) Patent No.: US 6,933,627 B2
(45) Date of Patent: Aug. 23, 2005

(54) HIGH EFFICIENCY LIGHTING SYSTEM

(75) Inventor: William George Wilhelm, Riverhead, NY (US)

(73) Assignee: Nextek Power Systems Inc., Hauppauge, NY (US)

( * ) Notice: Subject to any disclaimer, the term of this patent is extended or adjusted under 35 U.S.C. 154(b) by 0 days.

(21) Appl. No.: 08/820,496

(22) Filed: Mar. 19, 1997

(65) Prior Publication Data

US 2002/0003379 A1 Jan. 10, 2002

Related U.S. Application Data

(63) Continuation-in-part of application No. 08/606,219, filed on Mar. 7, 1996, now Pat. No. 5,786,642, which is a continuation-in-part of application No. 08/328,574, filed on Oct. 24, 1994, now Pat. No. 5,500,561, which is a continuation of application No. 08/129,375, filed on Sep. 30, 1993, now Pat. No. 5,363,333, which is a continuation of application No. 07/944,796, filed on Sep. 14, 1992, now abandoned, which is a continuation of application No. 07/638,637, filed on Jan. 8, 1991, now abandoned.

(51) Int. Cl.[7] .................................................. H02J 7/00

(52) U.S. Cl. ........................................................ 307/66

(58) Field of Search ............................. 307/64, 66, 43, 307/44, 59, 62, 82, 65, 45–49, 85–87; 323/906; 315/86

(56) References Cited

U.S. PATENT DOCUMENTS 2,194,822 A 3/1940 Dannheiser .................. 171/97
3,808,452 A * 4/1974 Hutchinson .................. 307/64
4,075,504 A * 2/1978 Gnaedinger .................. 307/66
4,100,427 A * 7/1978 Durand et al. ................ 307/87
4,206,608 A 6/1980 Bell ............................ 60/698
4,220,872 A * 9/1980 Fahey ......................... 307/32
4,287,465 A * 9/1981 Godard et al. ................ 307/66
4,315,163 A 2/1982 Bienville ..................... 307/66
4,315,208 A * 2/1982 McElroy et al. .............. 397/64
4,323,788 A * 4/1982 Smith .......................... 307/66
4,349,863 A * 9/1982 Peterson ...................... 363/20
4,401,895 A * 8/1983 Petovsek ..................... 307/66
4,426,587 A 1/1984 Nouet ......................... 307/66
4,464,724 A 8/1984 Gurr et al. .................. 364/492
4,484,104 A * 11/1984 O'brien ....................... 315/86
4,508,996 A 4/1985 Clegg et al. ................ 315/224
4,528,457 A * 7/1985 Keefe et al. .................. 307/46
4,539,487 A * 9/1985 Ishii ........................... 307/64
4,551,980 A 11/1985 Bronicki ...................... 60/698
4,630,005 A 12/1986 Clegg et al. ................ 331/113
4,634,953 A * 1/1987 Shoji et al. ................... 307/64
4,636,931 A 1/1987 Takahashi et al.
4,663,723 A 5/1987 Umeda ....................... 364/492
4,675,538 A * 6/1987 Epstein ........................ 307/64
4,675,539 A * 6/1987 Nichol ........................ 307/65
4,677,311 A * 6/1987 Morita ........................ 307/66
4,682,078 A 7/1987 Pascalide ..................... 315/86
4,725,740 A * 2/1988 Nakata ........................ 307/64
4,731,547 A * 3/1988 Alenduff et al. .............. 307/85
4,742,291 A 5/1988 Bobier et al. ................. 320/39
4,751,398 A * 6/1988 Ertz, III ...................... 307/66

(Continued)

FOREIGN PATENT DOCUMENTS

DE 4232516 A1 3/1993

*Primary Examiner*—Gregory J. Toatley, Jr.
(74) *Attorney, Agent, or Firm*—Alfred M. Walker

(57) ABSTRACT

A high efficiency lighting system maintains normal lighting conditions by lighting fixtures requiring DC electrical power. A power control device receives AC electrical power from a public utility converts AC power to DC power and delivers low voltage DC electrical power to lighting fixtures. A standby battery is provided to maintain power during power outages. Optionally, a photovoltaic DC electrical power source may be connected to the power control device, to provide alternate DC electrical power. In a further embodiment, a gas driven cogenerator unit may supply DC electrical power.

8 Claims, 16 Drawing Sheets

U.S. PATENT DOCUMENTS

| | | | | | |
|---|---|---|---|---|---|
| 4,755,804 | A | * | 7/1988 | Levati et al. | 307/64 |
| 4,789,790 | A | * | 12/1988 | Yamanaka | 307/66 |
| 4,794,272 | A | * | 12/1988 | Bavaro et al. | 307/66 |
| 4,818,891 | A | * | 4/1989 | Drinkwater | 307/64 |
| 4,821,166 | A | | 4/1989 | Albach | 363/89 |
| 4,860,185 | A | | 8/1989 | Brewer | 363/41 |
| 4,894,764 | A | | 1/1990 | Meyer et al. | 363/65 |
| 4,963,811 | A | * | 10/1990 | Weber | 307/66 |
| 5,001,623 | A | * | 3/1991 | Magid | 307/66 |
| 5,049,805 | A | * | 9/1991 | Celenza et al. | 307/66 |
| 5,053,635 | A | | 10/1991 | West | 307/67 |
| 5,059,871 | A | | 10/1991 | Pearlman et al. | |
| 5,089,937 | A | | 2/1992 | Carrubba | 361/394 |
| 5,164,609 | A | | 11/1992 | Popp | 307/147 |
| 5,200,644 | A | * | 4/1993 | Kobayashi et al. | 307/66 |
| 5,247,205 | A | * | 9/1993 | Mototani et al. | 307/66 |
| 5,268,850 | A | | 12/1993 | Skoglund | 364/480 |
| 5,289,045 | A | | 2/1994 | Lavin et al. | 307/64 |
| 5,471,114 | A | * | 11/1995 | Edwards et al. | 307/66 |
| 5,481,140 | A | | 1/1996 | Maruyama et al. | 307/11 |
| 5,493,155 | A | * | 2/1996 | Okamoto et al. | 307/45 |
| 5,500,561 | A | | 3/1996 | Wilhelm | 307/64 |
| 5,532,525 | A | | 7/1996 | Kaiser | 307/64 |
| 5,646,486 | A | * | 7/1997 | Edward's et al. | 315/86 |
| 5,861,684 | A | * | 1/1999 | Slade et al. | 307/66 |

* cited by examiner

HIGH EFFICIENCY LIGHTING SYSTEM

This application is a continuation-in-part of application Ser. No. 08/606,219 filed Mar. 7, 1996, now U.S. Pat. No. 5,786,642 which is a continuation-in-part of application Ser. No. 08/328,574, filed Oct. 24, 1994, now U.S. Pat. No. 5,500,561 dated Mar. 19, 1996, which was a continuation of application Ser. No 08/129,375, filed Sep. 30, 1993, now U.S. Pat. No. 5,363,333, which is a continuation of application Ser. No. 07/944,796, filed Sep. 14, 1992, now abandoned, which is a continuation of application Ser. No. 07/638,637, filed Jan. 8, 1991 now abandoned.

BACKGROUND OF THE INVENTION

The field of the invention is high efficiency uninterruptable lighting systems.

Uninterruptable power supplies are well known accessories especially when applied to computer equipment to "ride out" brief power outages so that no data is lost or compromised. Some have more battery storage capability so that operation may be maintained for an extended outage. Some special lighting systems are also protected in a similar fashion by an uninterruptable power source for critical applications such as operating rooms in hospitals. In lieu of such systems, reduced amounts of auxiliary emergency lighting is provided for special areas by modular systems which are only engaged during power outages; these modules are often used in stairwells and consist of a housing enclosing a battery, charger, power sensor and one or two flood lamps.

These prior art systems do nothing to enhance lighting efficiency, and would not be considered as substitutes for conventional lighting.

OBJECTS OF THE INVENTION

It is an object of this invention to provide an uninterruptable lighting system that can be routinely substituted for conventional building or office lighting.

It is another object of this invention to provide high efficiency operation with lower operating cost than conventional incandescent and fluorescent lighting systems.

It is yet another object of this invention to provide long term uninterruptability (3 hours+) with small storage volumes.

It is an object of this invention to provide optimum battery management for long storage life, ultra low maintenance, and economical operation.

It is a further object of this invention to provide for economical connection to an alternate energy source such as a solar photovoltaic (PV) panel.

It is another object of this invention to provide a system with enhanced safety through low voltage operation between the power control unit and the lighting fixtures.

It is yet another object to achieve high power quality with low interference through very high power factor and low total harmonic distortion.

It is an object of this invention to provide for expansion of the lighting system through a modular approach to increase subsystem and component standardization to reduce cost.

SUMMARY OF THE INVENTION

In keeping with these objects and others, which may become apparent, the present invention includes a high efficiency lighting system for maintaining normal lighting conditions by lighting fixtures requiring DC electrical power.

The system includes a power control means for receiving AC electrical power from a grid source and delivering required low voltage DC electrical power to the lighting fixtures. The power control means converts the AC electrical power to DC electrical power.

A battery provides, on a standby basis, the required DC low voltage electrical power to the power control means. The battery is connected to the power control means so that the battery may be maintained in a fully charged condition by the power control means during normal supply of AC electrical power from the grid source.

The power control means delivers required DC electrical power from the battery to the lighting fixtures during an AC electrical power outage to maintain the power without interruption.

The power control means can be a plurality of multiple power control means, each connected to its own battery for maintaining the lighting in a building with multiple rooms.

An optional photovoltaic source of DC electrical power may be connected to the power control means for reducing the amount of electrical power taken from said grid source.

The battery provides, on a standby basis, DC low voltage electrical power to the power control means, which power control means maintains the battery in a fully charged condition by electrical power from an AC grid source.

In a version using AC power input only without an auxiliary battery or photovoltaic panel, the high efficiency lighting system for maintaining normal lighting conditions of lighting fixtures requiring DC electrical power, includes the power control means for receiving AC electrical power from a grid source and delivering required DC electrical power to the lighting fixtures, as well as a power control means converting AC electrical power to DC electrical power.

In a further embodiment for remote use, such as a remote campsite without access to conventional AC power, a high efficiency lighting system maintains normal lighting conditions of lighting fixtures requiring DC electrical power. The remote system includes a power control means for receiving DC electrical power from a photovoltaic panel and delivering required low voltage DC-electrical power to the remote lighting fixtures, and the power control means controls charging of a battery.

The battery also provides, on a standby basis, the required DC low voltage electrical power to the power control means. It is connected to the power control means while being maintained in a charged condition by the power control means, during daylight hours of input of power from the photovoltaic panel.

Moreover, the power control means delivers required DC electrical power from the battery to the lighting fixtures during periods of time when power from the photovoltaic panel is not available, such as at night times.

The present invention also provides A DC power supply system for DC loads requiring DC electrical power that includes power control means for receiving AC electrical power from a grid source and delivering required low voltage DC electrical power to said DC load. It converts the AC electrical power to DC electrical power.

In addition, one embodiment of the present invention includes a battery means that provides required DC low voltage electrical power on a standby basis to the power control means.

The battery means is connected to the power control means so as to permit the battery control means to maintain the battery in a fully charged condition during normal supply of AC electrical power from the AC grid source.

The power control means of the present invention delivers required DC electrical power from the battery means to a DC load during an AC electrical power outage so as to maintain normal operation of the DC load without interruption.

In addition, the present invention optionally provides a DC power supply system having a photovoltaic [PV] source of DC electrical power connected to the power control means in order to reduce the amount of electrical power taken from said grid source.

The DC power supply system of the present invention optionally further provides a cogeneration source of DC electrical power connected to the power control means to reduce the amount of electrical power taken from a grid source.

Further, the present invention alternatively provides a DC power supply for DC loads requiring DC electrical power. The DC power supply includes a separate power control means for receiving AC electrical power from a grid source. The DC power supply delivers required low voltage DC electrical power to a DC load. The power control means converts the AC electrical power to DC electrical power.

In addition, in an alternate embodiment, the DC power supply system for DC loads requiring DC electrical power includes a power control means for receiving DC electrical power from a DC power source and for delivering required low voltage DC electrical power to the DC load. The power control means is also directed toward the function of controlling charging of a battery means.

In this battery-charging embodiment, the present invention's battery means provides the required DC low voltage electrical power on a standby basis to the power control means.

Also, in this battery-charging embodiment, the battery means is connected to the power control means so as to maintain the power control means in a charged condition during hours of input from the DC power source.

Furthermore, in this battery-charging embodiment, the power control means delivers required DC electrical power from the battery means to the DC load during times when power from the DC power supply is not available.

The DC power supply system of the present invention further provides an optional embodiment wherein the DC power source is a cogeneration unit.

Alternatively, in a different embodiment of the present invention, the DC power supply system has a DC power source that is at least one photovoltaic panel.

In yet another embodiment of the present invention, the DC power supply system furnishes power to a DC load that is a household appliance. The household appliance may alternatively be a microwave oven, a heater, or any other household electrical device.

Furthermore, in further embodiments with or without access to conventional AC power, a DC generator (e.g.—powered by a natural gas engine) is used either as a primary source of electrical power or as a cogeneration companion to normal AC grid power. Thus the power control means can be supplied power for use by a high efficiency lighting system in much the same manner as DC electrical power is received from a photovoltaic panel.

It can be appreciated that any compatible DC load can be serviced by the power control means of this high efficiency lighting system in addition to DC ballasted fluorescent lighting or instead of the latter lighting load. These other DC loads can be supplied with standby power from a storage battery as well. Some examples of DC loads include household appliances, microwave ovens, and heaters.

BRIEF DESCRIPTION OF THE DRAWINGS

The present invention can best be understood in conjunction with the accompanying drawings, in which.

DETAILED DESCRIPTION OF THE INVENTION

Figure 1:
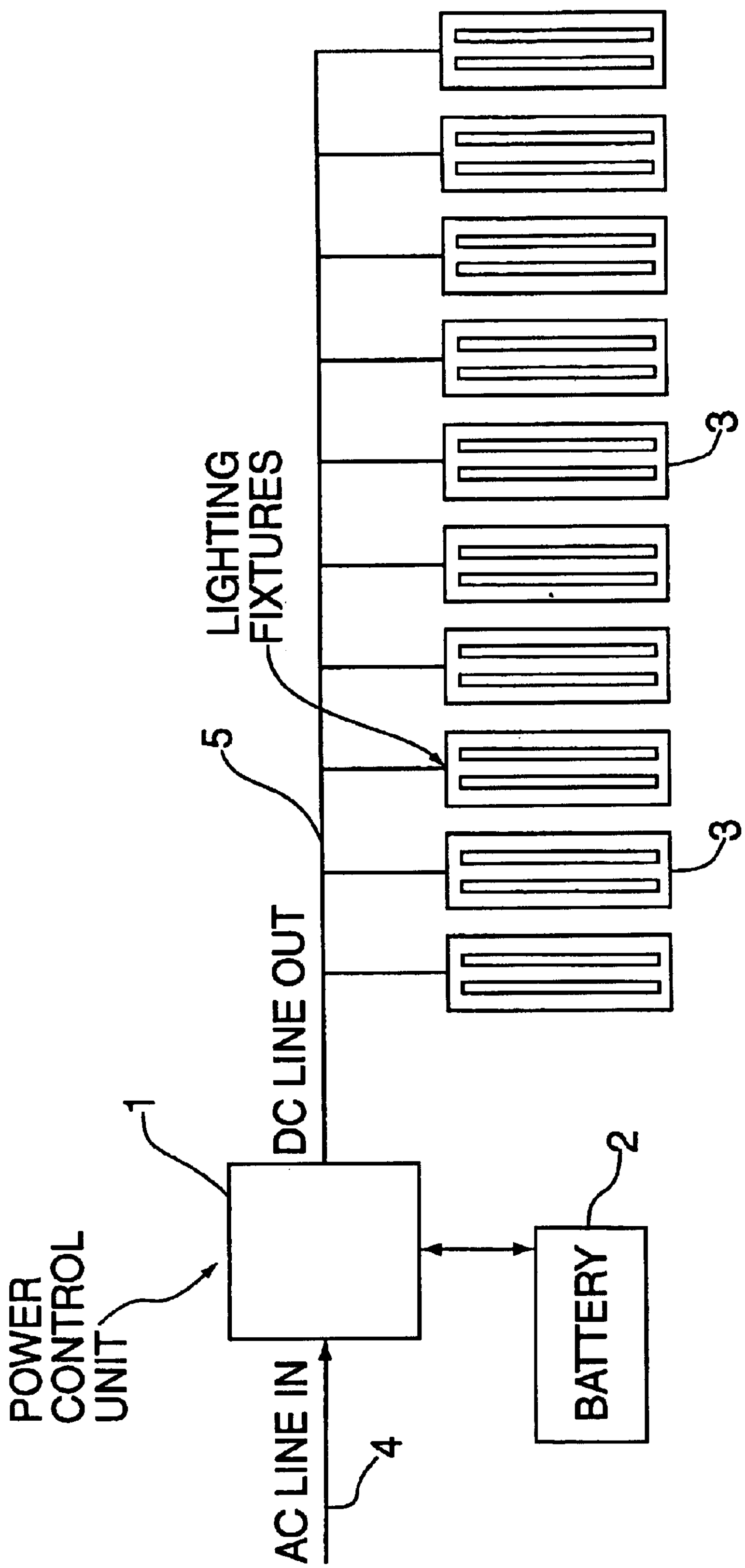
FIG. 1 is a block diagram of basic uninterruptable lighting system.

FIG. 1 shows a block diagram of the major components of an uninterruptable lighting system of this invention. It may be installed anywhere conventional building lighting is required. Unlike emergency lighting, this is a full service, high quality lighting product. It functions with standard fixtures and lamps, without compromise in output quality and with no flicker in the event of a power failure. This permits normal building activities to continue for several hours using battery storage without disruption of work activity due to loss of lighting. The key subsystem that ties the entire system together is the power control unit 1 which normally uses AC grid power to supply the lighting energy and keep the battery 2 charged. The lighting fixtures 3 are fluorescent tubes using electronic ballasts which have a low voltage (nominal 26.6 volts) DC input supplied by line 5 from power control unit (PCU) 1. During a power outage, the DC line 5 is supplied by battery 2.

Figure 2:
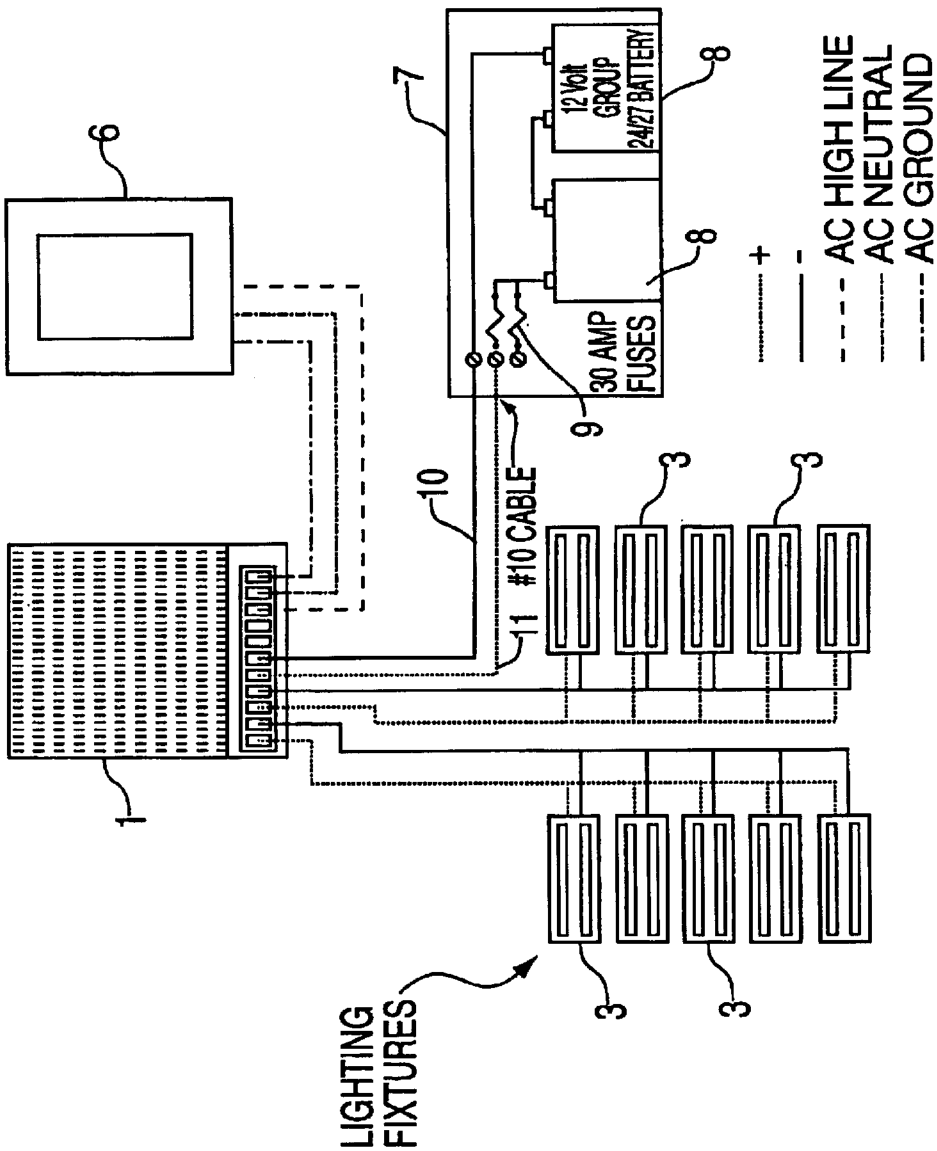
FIG. 2 is a physical block diagram of basic uninterruptable lighting system.

FIG. 2 shows a physical block diagram showing the AC electric service panel 6 with a three wire cable system supplying either 120 or 220 VAC to PCU 1. Battery case 7 contains two group 24/27 deep discharge lead acid storage batteries wired in series and through a 30 amp fuse to the PCU 1. The wiring to all lighting fixtures 3 is at a nominal 26.6 volts DC. In the preferred embodiment, each PCU can power ten two tube 48 inch T8 fluorescent fixtures or 20 single tube fixtures.

Figure 3:
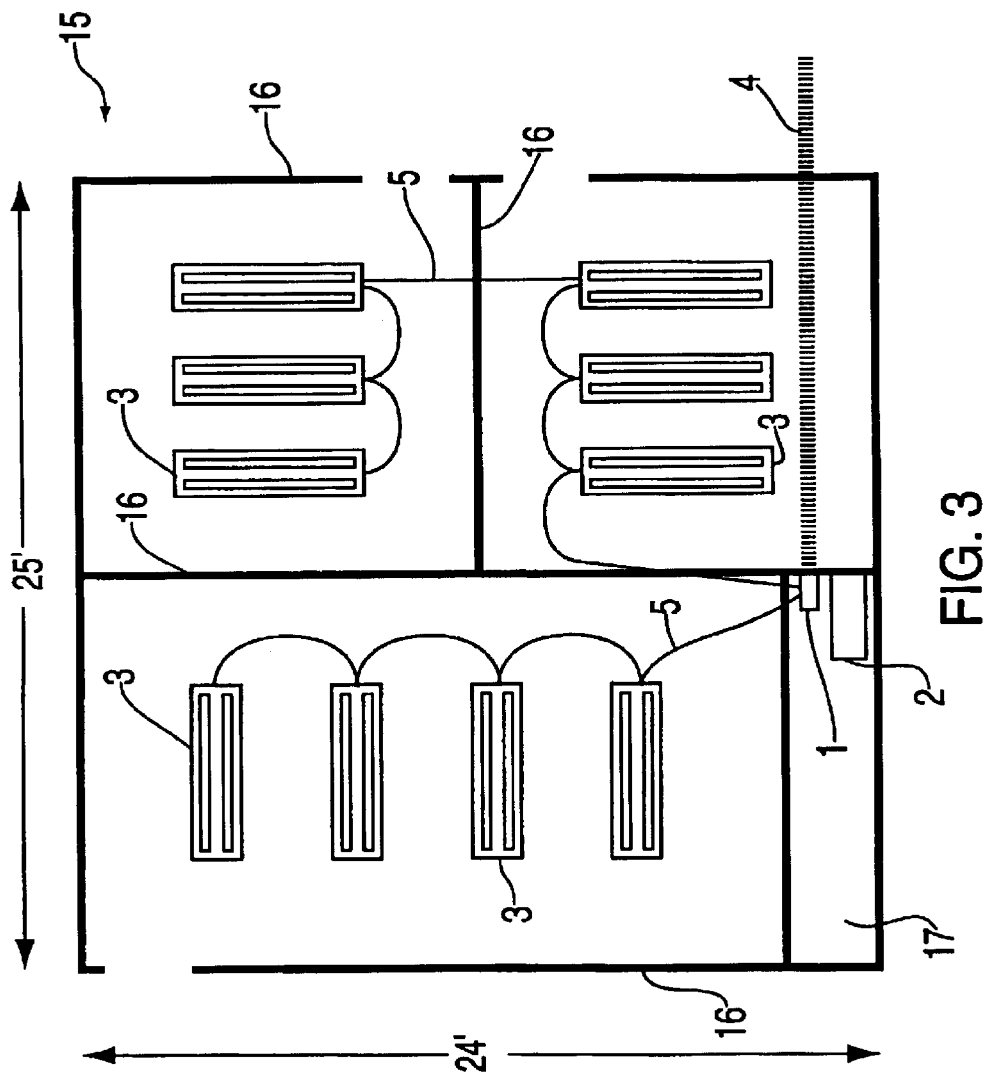
FIG. 3 is a wiring layout of a single lighting module.

FIG. 3 shows a wiring layout for three offices as controlled by a single PCU 1. A closet area 17 is used to house battery 2. The AC line 4 leads to PCU I, which is placed in the ceiling cavity. The DC wiring 5 to the lighting fixtures is also in the ceiling cavity.

The 220 VAC input power to the PCU is 725 watts for an AC rms of approximately 3 amps. The equivalent 120 VAC unit will be about 6 amps. Because the PCU is power factor corrected to 0.99, a 20 amp circuit breaker and number 12 wire can support a maximum of 3 PCU's from a 120 volt line and 6 units from a 220 volt line for a total DC power output of about 2100 watts and 4200 watts respectively.

Figure 4:
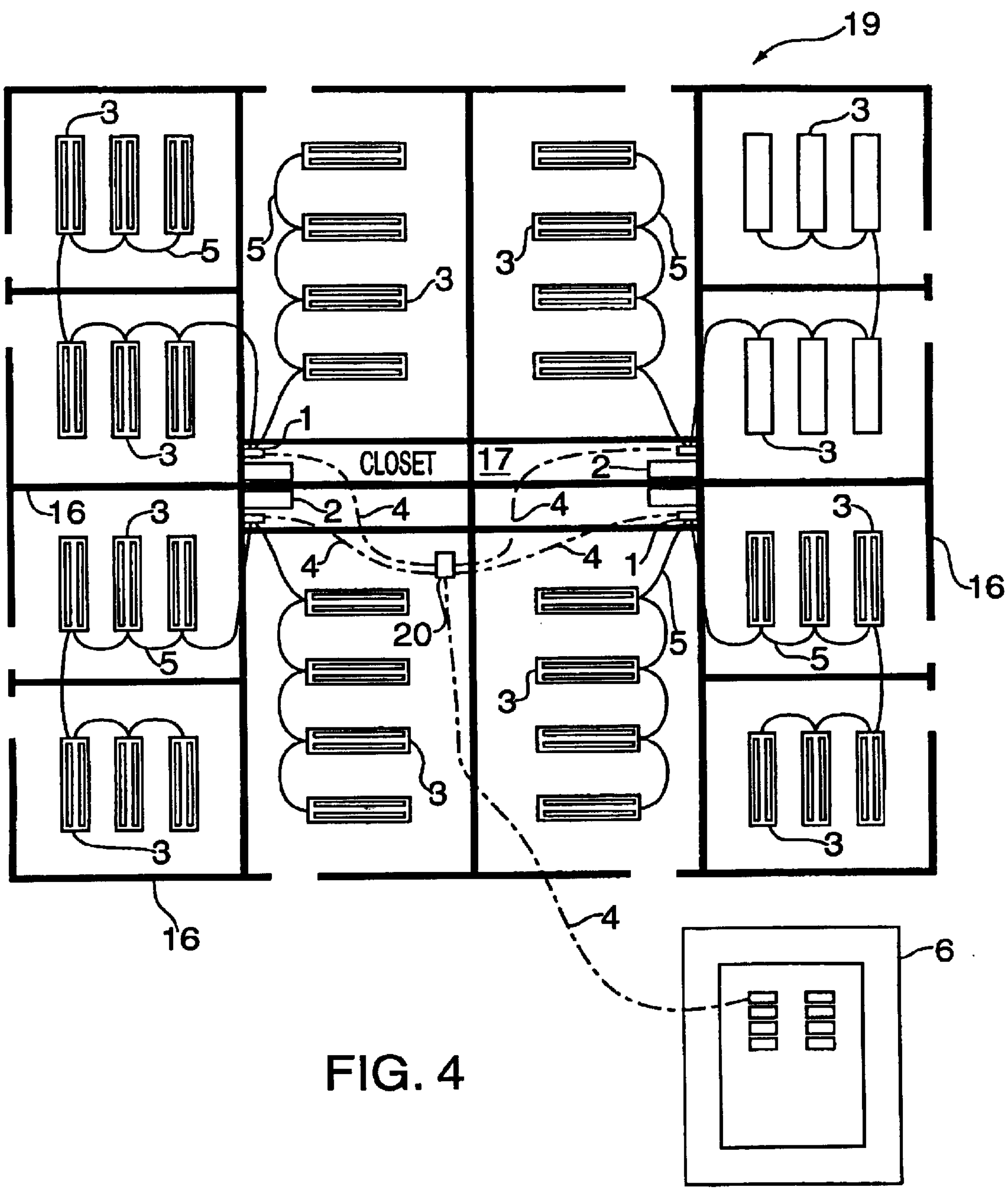
FIG. 4 is a wiring layout of a four module system.

FIG. 4 shows a wiring layout serving 8 small offices and four larger ones. This involves the use of four separate uninterruptable lighting systems using four PCU's 1 and four battery modules 2 located in four central closets 17. The four PCU's are supplied from a single 220 VAC circuit breaker in power panel 6 via AC cable 4 as distributed from distribution box 20. Each of the lighting systems supplies 10 two lamp fixtures 3.

Figure 5:
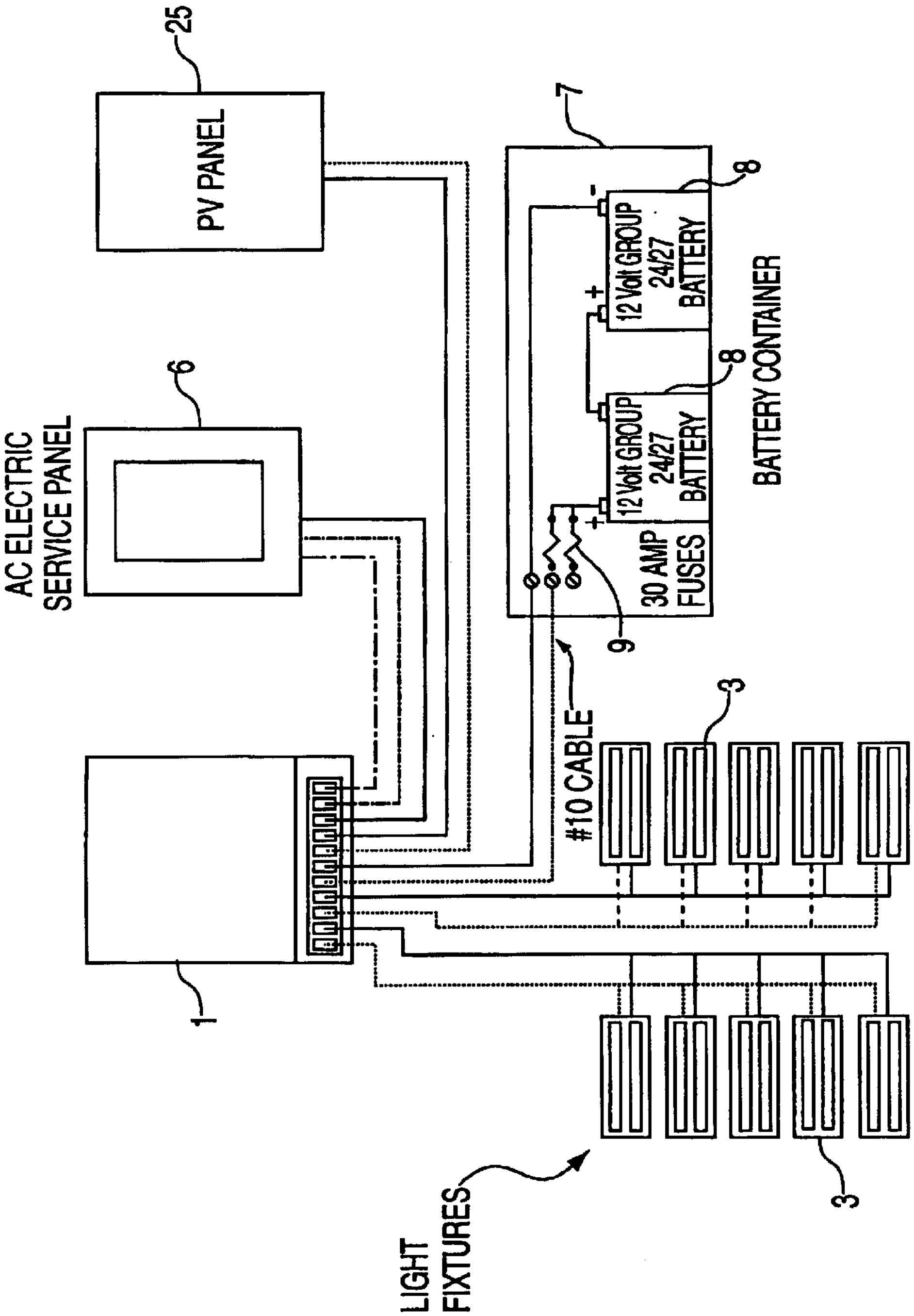
FIG. 5 is a block diagram of lighting system with a PV panel.

FIG. 5 shows an uninterruptable lighting system including a PV panel 25.

Figure 6:
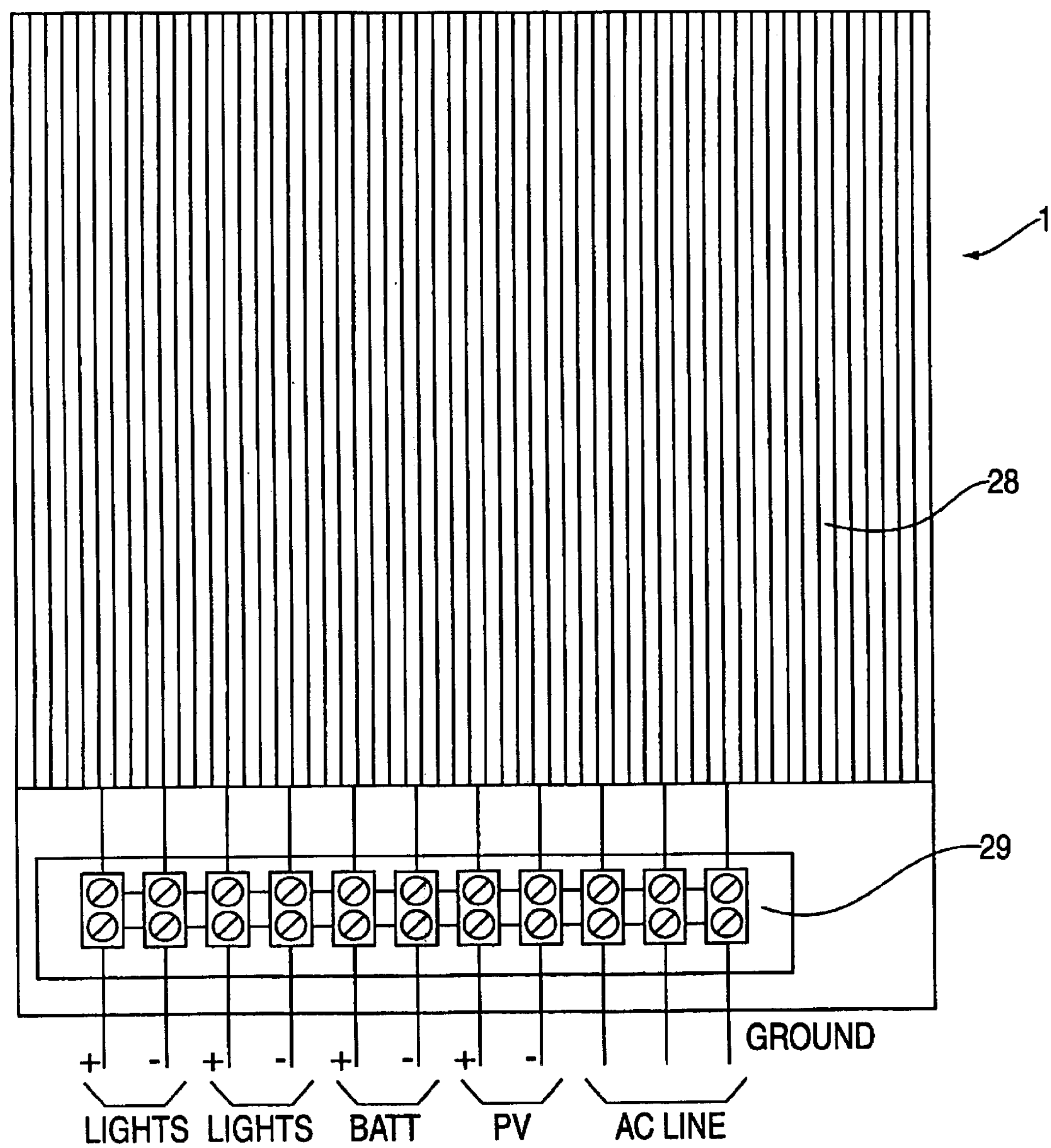
FIG. 6 is a front view of power control unit.

As shown in FIG. 6, a front view of PCU 1, it is simply wired to two terminals. This simple system configuration permits high security lighting using an AC line, battery back-up, and PV shared contribution. A system with the PCU alone attached to the AC line is a viable lighting system that can pay for itself by providing high efficiency DC lighting. By adding the battery subsystem, the user achieves uninterruptable lighting. By using a system without a battery but with AC input and a PV panel, the power savings of the PV contribution is achieved with the balance supplied by the AC input. In an area remote from the AC grid, a system using a PCU attached to a large PV panel and a larger battery can supply totally solar lighting. The PCU is sufficiently flexible to support all of these configurations of lighting systems. It can also supply other DC loads besides lighting, such as for example, household appliances, microwave ovens, heaters and the like. Furthermore, it can also alternately accept external DC power from many varied sources such as wind generators or engine powered generators.

FIG. 6 shows a front view of PCU 1 with finned heat sink 28 and terminal strip 29.

Figure 7:
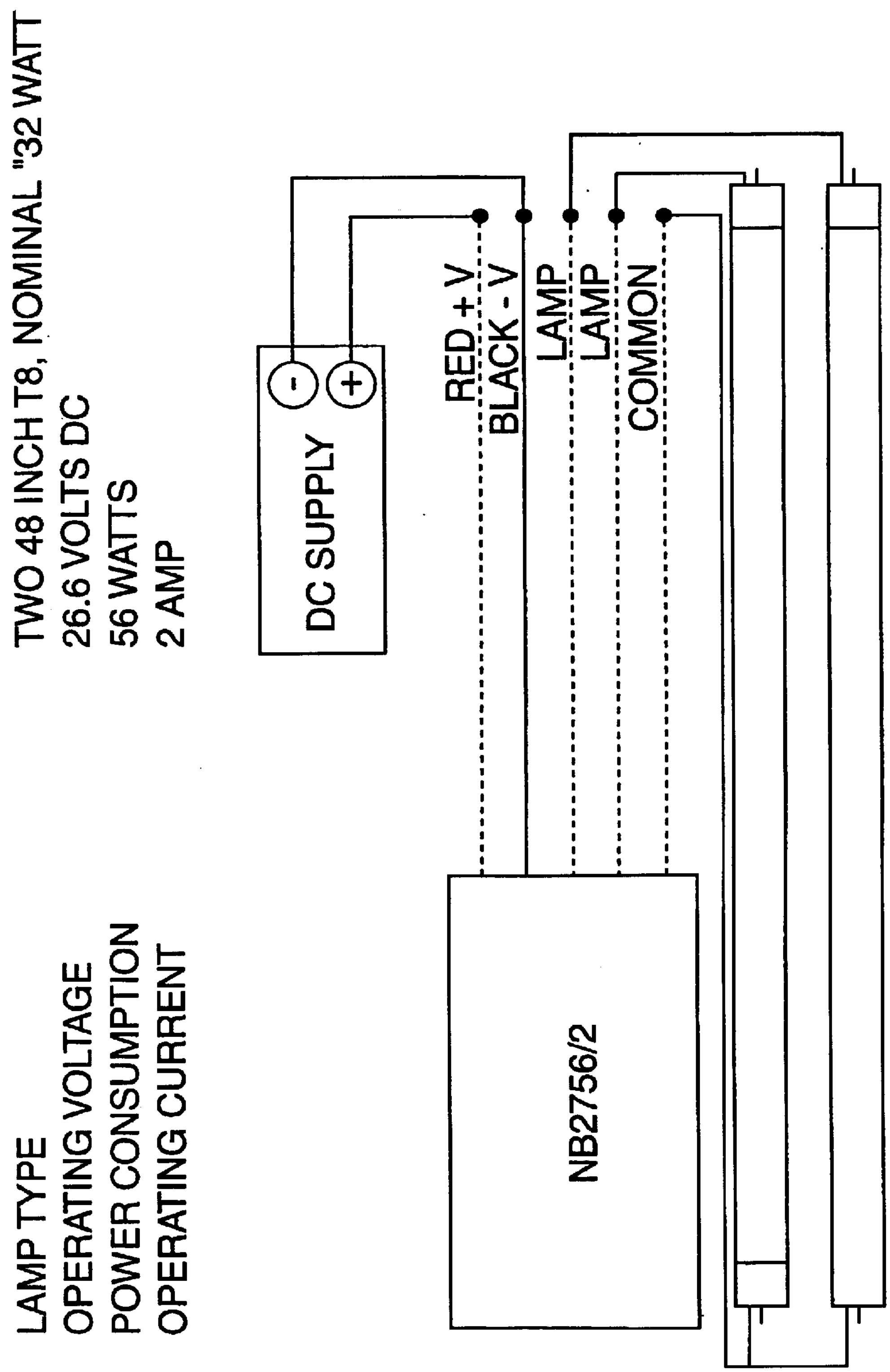
FIG. 7 is a wiring diagram and specs for two lamp ballast.
Figure 8:
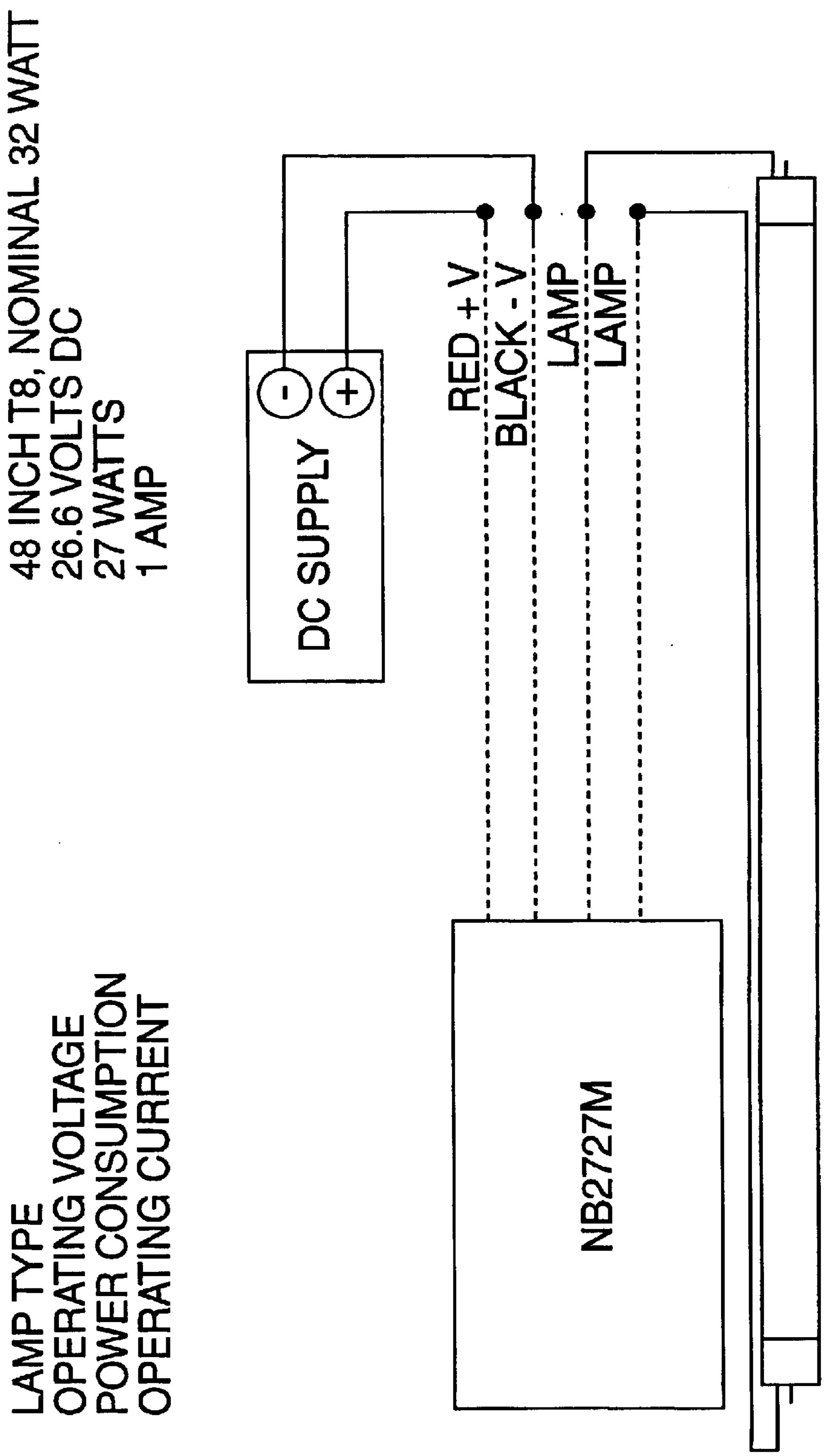
FIG. 8 is a wiring diagram and specs for single lamp ballast.

FIGS. 7 and 8 show the wiring diagrams and specifications for the two lamp and one lamp DC ballasts respectively (designated as NB2756/2 and NB2727M respectively).

Figure 9:
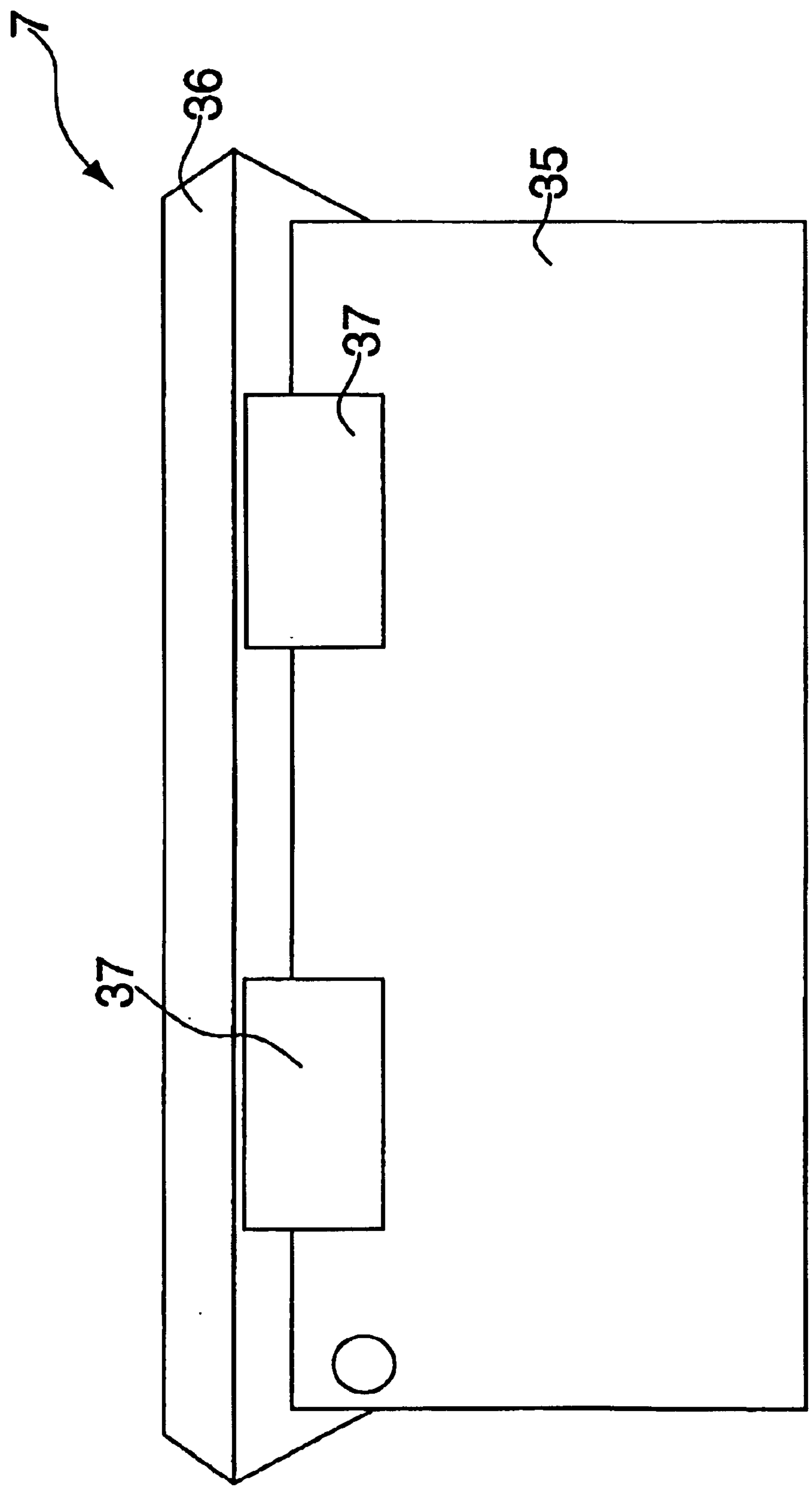
FIG. 9 is a front view of battery enclosure.

FIG. 9 shows a front view of the battery case with hinged lid 36 and latches 37. It is a thermoplastic case rated only for sealed type lead acid batteries.

Figure 10:
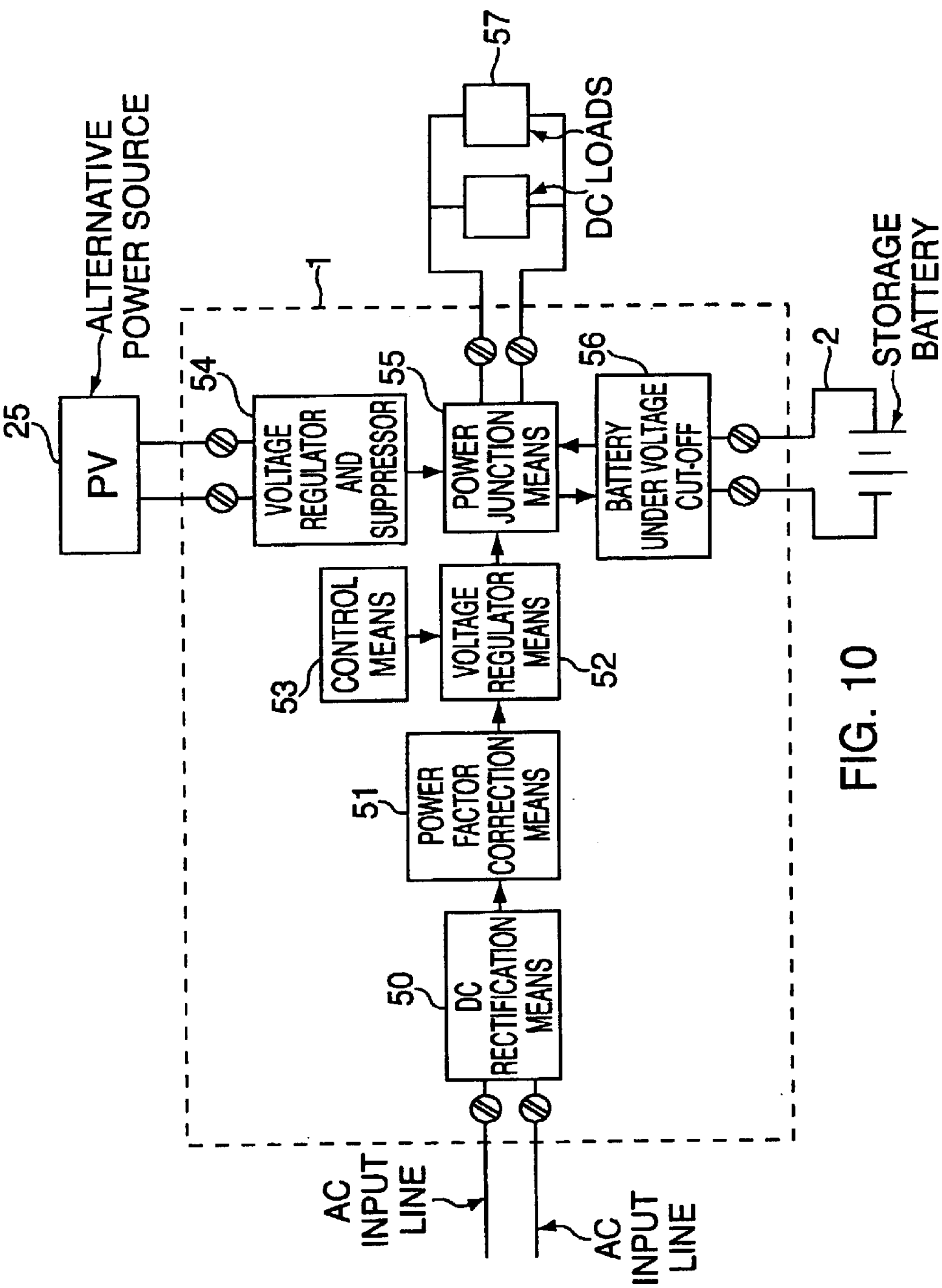
FIG. 10 is a block diagram of power control unit.

FIG. 10 shows a block diagram of the PCU 1. The AC input is rectified by DC Rectifier Means 50 such as a bridge circuit. The Power Factor Correction Means 51 is used to achieve a high power factor (0.99) at the AC input. The Control Means 53 and Voltage Regulator means 52 interact through circuits such as pulse width modulation and DC to DC switching power supply topologies to provide the nominal 26.6 volts to the lighting ballasts or other suitable DC loads 57 through the power junction means 55. Other voltages are also possible, such as 13.3, 26.6, 39.9 etc.

The Battery Undervoltage Cut-Off 56 disconnects the battery 2 in situations of depletion to prevent "over sulfation" or chemical and physical damage to the storage battery. The PV Voltage Regulator and Suppressor 54 is a power conditioner block to suppress voltage transients (such as from lightning strikes in the vicinity) and also to prevent over charging of the storage battery from the PV panel 25.

An embodiment of control means 53 determines if the utility power drawn is above a manually pre-set threshold or a threshold derived from an automatic setpoint circuit. If the utility power drawn exceeds this threshold voltage regulator means 52 output voltage will be set such that power junction means 55 will be biased accordingly such that power to DC loads 57 will be drawn from storage battery 2 and/or PV source 25 through its PV voltage and suppressor 54. In this manner. AC cower peaks from the utility are reduced as are monthly utility charges if a peak power surcharge is assigned. The power sharing-between PV source 25 and battery 2 is regulated by the output voltage of PV source 25 as modified by PV voltage regulator and suppressor 54. The interaction of voltage output at suppressor 54 with that of battery 2 voltage via biasing within power function means 54 determines the level of power sharing between these DC secondary sources. The latter action also describes the sharing of power between PV panel 25 and battery 2 during periods of utility power outage.

Figure 11:
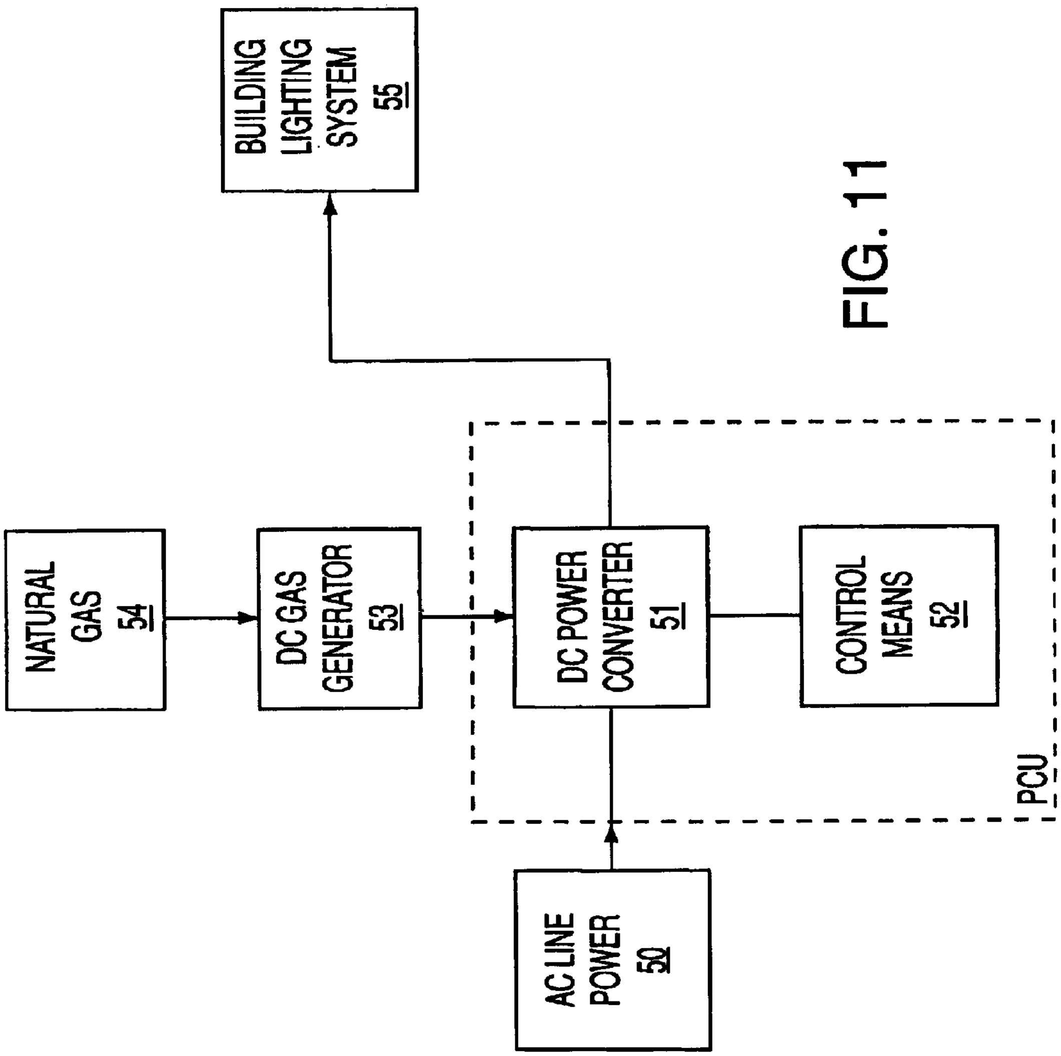
FIG. 11 is a: block diagram of an alternate lighting system using natural gas cogeneration.

FIG. 11 is an alternate embodiment for a loadside powered lighting system including natural gas in a cogeneration component. AC power 50 is normally converted to DC power by DC power converter 51 and control means 52. However, a cogenerator in the form of a DC gas generator 53 receives natural gas from a natural gas source 54, and sends DC power to building lighting system 55, such as electronic ballasted fluorescent lighting. This system provides a flatter and more predictable power demand for electric utility customers at building lighting system 55, since it supplants peak power from electric utility generating sources. This results in reduced demand charges, since gas offers a lower cost per unit of energy consumed, compared to conventional AC power from a public utility.

The cogeneration system can run continuously for lighting load 55, without having to be sent back to AC line power 50, which avoids the need for costly AC synchronization methods and sine wave purity, as is needed when sending excess-electricity back to a public utility.

DC gas generator 53 directly couples to building lighting system 55 through a diode isolator that allows either AC or DC power to operate building lighting system 55.

Figure 12:
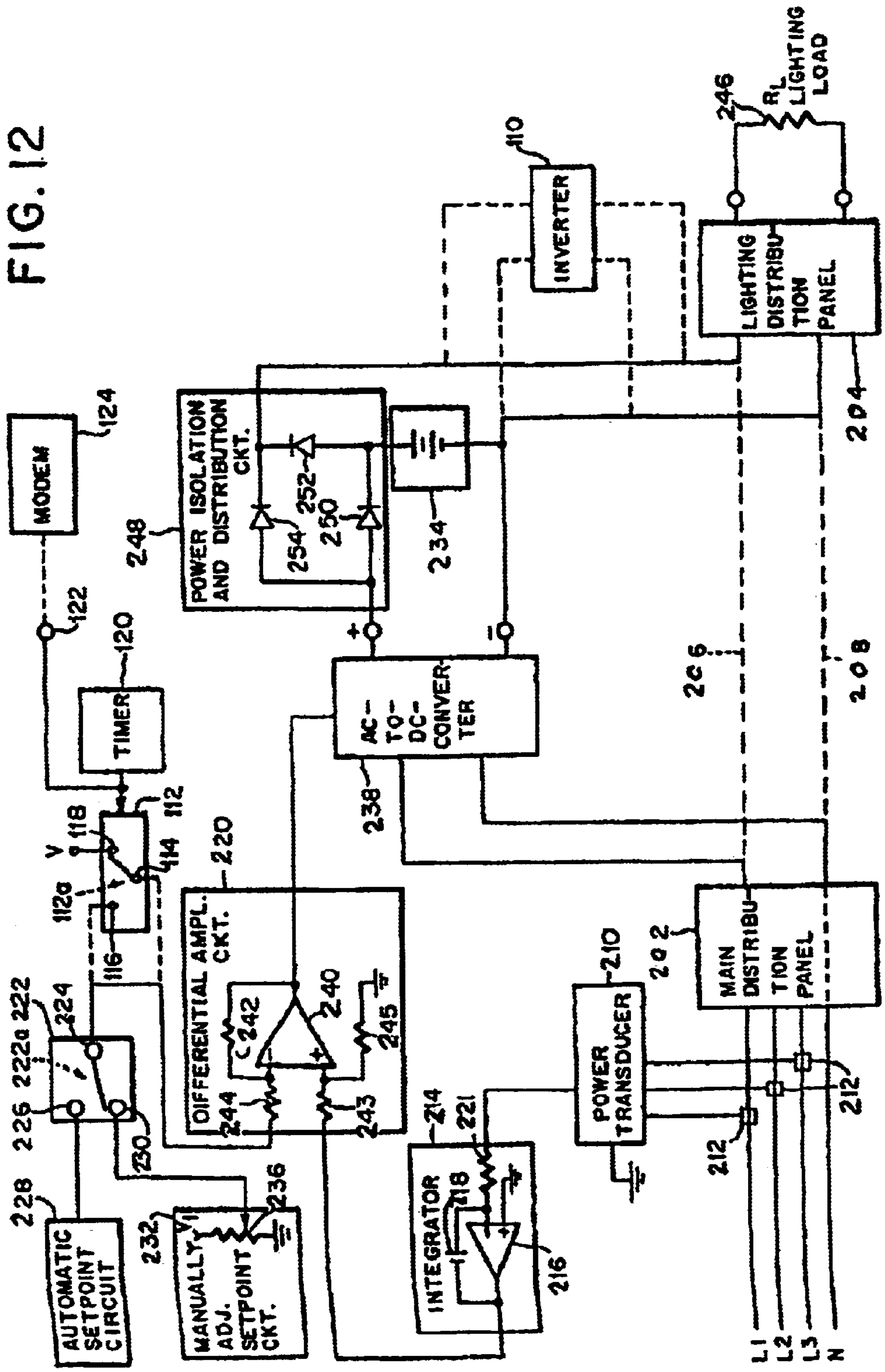
FIG. 12 is a block diagram of a customer side, power management system and illustrating its interface with existing electric utility power lines of the customer facility.

Referring now to FIG. 12 of the drawings, it will be seen that a customer side, power management system formed in accordance with the present invention may be easily interconnected with the existing electric power wiring of the customer facility to monitor the load requirements of the customer. To facilitate an understanding of the invention, FIG. 12 shows three phase power wiring (i.e., wires labeled L1, L2 and L3 representing each phase) and a neutral (i.e., N) wire coming from the utility and being received by the customer facility. The three phase wires, L1, L2 and L3 and the neutral wire N are received by a main distribution panel 202 of the customer facility. The main distribution panel 202 distributes the power throughout the facility, and in many cases provides power to a lighting distribution panel 204, which, as its name implies, distributes power to the various lighting circuits of the facility. That is, the main distribution panel 202 conventionally distributes the three phase power wiring of the electrical utility throughout the consumer facility and in so doing distributes power to the various loads served by the customer facility. There are three types of very common AC electrical loads which may be required to be satisfied by the AC electrical power generated at the public or electrical facility and emanating from the illustrated consumer facility and they are a Lighting Load Semi-Random Punctuated Loads, and Semi-Random Longer Cycle Loads. Thus, the three phase power wiring L1, L2 and L3 and the neutral wiring N connects from the public utility side of the main distribution panel 202 and issues therefrom as AC electrical conductors on the customer side of this panel into connection with the composite of loads which are required to be satisfied by the power emanating from the electrical utility. Normally, the main distribution panel 202 and the lighting distribution panel 204 are interconnected by one or more power lines 206, including a neutral line 208, but for purposes of this invention, the interconnecting lines between the main distribution panel and the lighting distribution panel are interrupted, as illustrated by the broken lines in FIG. 12. It will be understood that the interruptions of the lines between the main distribution panel 202 and the lighting distribution panel 204 with introduction of the inverter 110 are necessary only if the Lighting Load is not capable of being powered solely by direct current, as distinct from a situation where the Lighting Load may be powered in whole or in part, by AC power. To the extent it is not so capable, the inverter 110 must be employed to supply AC power, all in the event that there could be failure of the electrical facility to deliver any AC at all.

The power management system includes a power transducer 210. The power transducer 210 has associated with it one or more voltage or current sensors 212, each sensor being coupled to a respective power line phase. The power transducer 210 measures in real time the power consumed by the customer facility from the electric utility, and provides an output signal corresponding to this measurement. The output signal provided by the power transducer 210 is proportional in magnitude to the power consumed by the customer facility. For example, the output signal may be in terms of voltage, and have a range of from 1 to +10 or −10 volts, which would correspond to a power consumption of from 0 to 100 kilowatts. A suitable power transducer 210, which may be used for the power management system of the present invention, is Part No. PCB-20 manufactured by Rochester Instrument Systems, Inc.

The output signal from the power transducer 210 is preferably provided to an integrator circuit 214. The integrator circuit 214 averages the real time power measurement made by the power transducer. The integrator circuit 214 simulates the operation of a similar integration circuit, which the utility uses to average the peak power demands of its customers.

The integrator circuit 214 may be formed in various ways, including using an operational amplifier 216 with a feedback capacitor 218 and an input resistor 220, as shown in FIG. 12. The values of capacitor 218 and resistor 220 are selected to provide a desired integration time. The integrator circuit 214 shown in FIG. 12 provides a negative gain; accordingly, if such a circuit is used, it may be coupled to the 0 to −10 V output of the power transducer to provide a positive output voltage signal which varies in response to changes in power drawn from the utility and sensed by the sensor 212.

The power management system further includes a comparator circuit, which in a preferred form is a differential amplifier circuit 220. The output of the integrator circuit 214 is provided to a first input of the differential amplifier circuit 220. A second input of the differential amplifier circuit 220 is connected to a switching circuit 222, which is functionally depicted in FIG. 12 as a single pole, double throw switch 222*a*.

More specifically, the "wiper" arm 224 of the switching circuit is connected to the second input of the differential amplifier circuit 220, one pole 226 of the switching circuit is connected to an automatically adjustable set point circuit 228, and the other pole 230 of the switching circuit is connected to a manually adjustable set point circuit 232.

The automatically and manually adjustable set point circuits 228, 232 provide at threshold signal, which may be in the form of a voltage, through the switching circuit 222 to the second input of the differential amplifier circuit 220. The threshold signal represents the power level at which a secondary source of DC power, such as a storage battery 234, forming part of the power management system is to take over in supplying power to one or more various loads in the customer's facility, as will be described.

Figure 13:
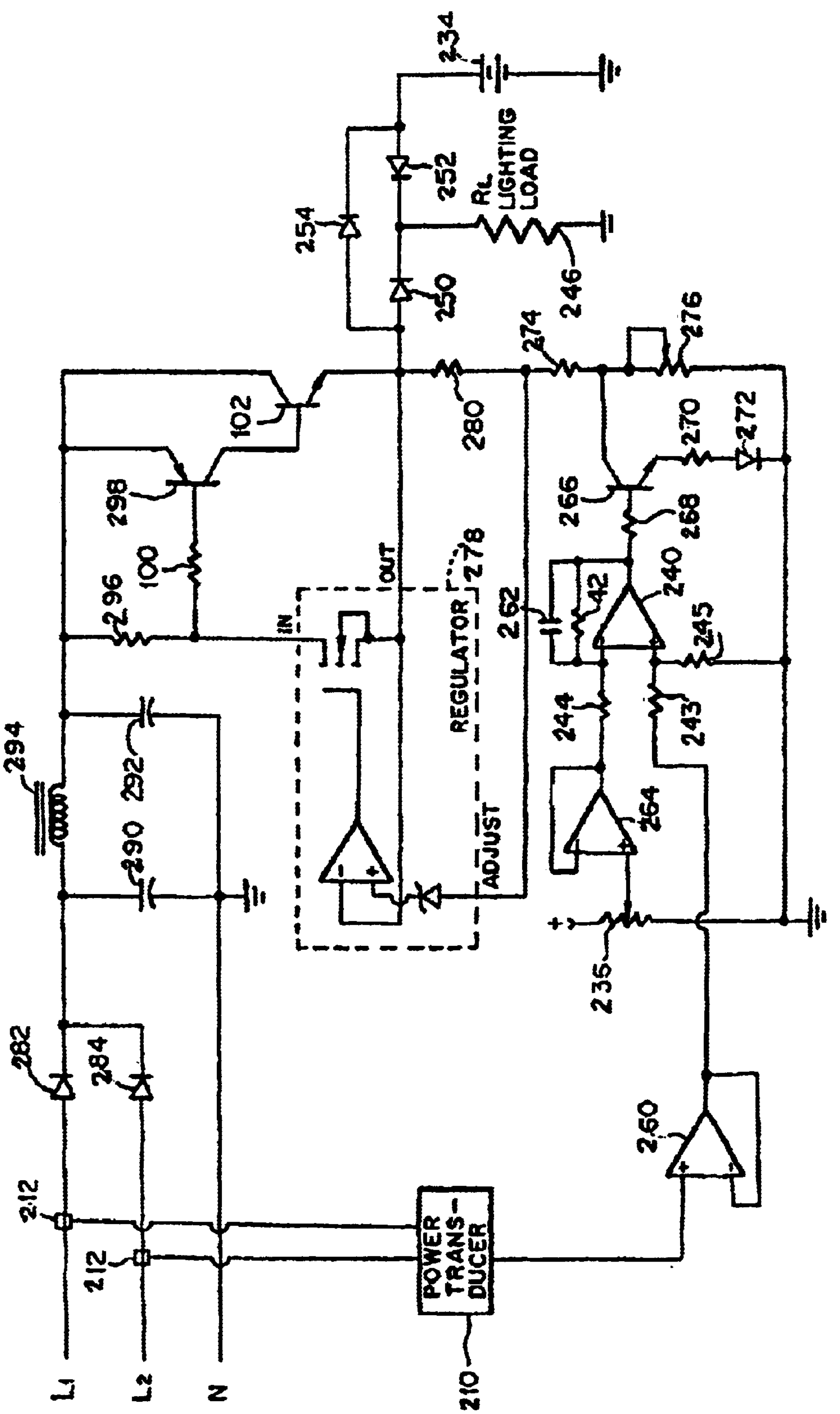
FIG. 13 is a schematic diagram of an alternate power management system.

Various manually adjustable set point circuits are envisioned to be used in the present invention. One example of such is a potentiometer 236 connected between positive and negative voltages or a voltage V1 and ground, with its wiper arm connected to the pole 230 of the switching circuit 222. Such a circuit would provide a threshold voltage to the differential amplifier circuit 220. The set point circuit 232 would be adjusted after an analysis of the customer's energy consumption profile. The threshold would be set so that any stochastic or recurrent (i.e., non-random, time of day) peaks in the customer's daily power demand would be supplied in full or proportionally by the secondary DC power source of the power management system, as illustrated by FIG. 13.

The automatically adjustable set point circuit 228 will periodically derive and store the maximum value of the actual peak power demands over predetermined time intervals, for example, daily or monthly, and provide a threshold which is based on a "moving average" computed by the circuit. This threshold signal is provided to the input of the differential amplifier circuit 220 through the switching circuit 222. The automatic set point circuit 228 will automatically adjust the threshold signal in accordance with the moving average of the customer's peak power requirements, which it calculates algorithmically. An example of such a circuit is disclosed in U.S. Pat. No. 4,731,547, which issued to Phillip Alenduff et al., the disclosure of which is incorporated herein by reference.

As its name implies, the comparator (or more preferably the differential amplifier) circuit 220 will compare the threshold signal provided by either set point circuit 228,232, which is selected by the switching circuit 222 with the output signal from the integrator circuit 214, which output signal represents the power being drawn from the utility averaged over the predetermined integration period. IF the output signal from the integrator circuit 214 is greater in magnitude than the threshold signal, i.e., indicating that excessive or peak power is being consumed, the differential amplifier circuit 220 will sense this and provide a proportional output signal, which is compatible with that required to control an AC-to-DC converter or switching mode type power supply 238 forming part of the power management system, as will be described.

One form of a differential amplifier circuit 220 which is suitable for use in the present invention is an operational amplifier 240 having a feedback resistor 242 and an input resistor 244, with the threshold signal being provided to the inverting input of the operational amplifier 240 through the input resistor 244, and the output signal from the integrator circuit 214 being provided to one side of a second input resistor 243 whose other side is connected to the non-inverting input of the operational amplifier and to another resistor 245 to ground. When the values of the first input and feedback resistors 244, 242 equal those of the second input and the ground resistors 243, 245 respectively, the output signal from the differential amplifier circuit 220 will be a voltage level equal to the difference between the voltage levels of the integrator circuit's output signal and the threshold signal, multiplied by the ratio between the values of the feedback and first input resistors 242, 244. Accordingly, the output signal from the differential amplifier circuit 220 is preferably a voltage level which varies proportionally with the difference between the output signal from the integrator circuit 214 and the set point threshold signal level.

As will be described in greater detail, many AC-to-DC power supplies adjust their output voltage levels in proportionment to the voltage applied to their control signal input, and operate on positive control signal voltages, for example, 0 volts to 10 volts for an output adjustment of from 125 volts to 110 volts. To prevent negative voltage swings in the output signal from the differential amplifier circuit 220, such as when the level of the output signal of the integrator circuit is below the set point threshold signal level, one can provide a positive supply voltage to the appropriate supply terminal of the operational amplifier 240, and ground the negative supply terminal. Alternatively, one may connect a diode (not shown) having its anode connected to ground and its cathode connected to the output of the operational amplifier 240 to clamp the differential amplifier's output signal to 0 volts when the output signal from the integrator circuit 14 is less than the set point threshold signal level.

Instead of using the differential amplifier circuit 220, which provides a continuously variable output signal which is proportional to the difference between the threshold signal and the integrator circuit's output signal, a simple comparator, such as in the form of an operational amplifier, may be used. The integrator's output signal and the threshold signal are provided to the two inputs of the comparator, and the comparator's output signal is provided to the control input of the AC-to-DC converter 238. When the integrator circuit's output signal is greater than the threshold signal, the output signal of the comparator will be in a first state to signal the AC-to-DC converter 238 to provide a first output voltage level. When the integrator circuit's output signal is less than or equal to the threshold signal, the output signal of the comparator will be in a second state to signal the AC-to-DC converter 238 to provide a second output voltage level.

As mentioned previously, the power management system of the present invention includes an AC-to-DC converter circuit 238. Preferably, the converter circuit 238 is a power supply of the switching type, which is known to have good regulation and high efficiency. The power line 206 and neutral line 208 from the main distribution panel 202, which originally were provided to the lighting distribution panel 204, are now provided to the AC inputs of the switching power supply 238. The output signal from the comparator or differential amplifier circuit 220 is provided to the control input of the power supply. The switching power supply 238 will convert the AC power provided to it into a DC voltage and current to run a particular load or loads at the customer facility, such as a fluorescent lighting load 246, as illustrated by FIG. 12. A suitable AC-to-DC switching power supply 238 which may be used in the power management system of the present invention is Part No. 2678644 manufactured by Technl Power Corp., a Penril Company, located in Connecticut. For greater power handling requirements, several power supplies may be connected in parallel, all being controlled by the comparator or differential amplifier circuit 220. With whichever AC-to-DC converter 238 that is used, the comparator or differential amplifier circuit 220 is designed to provide the compatible control signal to vary the converter output as required.

The output voltage of the switching DC power supply 238 is adjustable proportionally to the control signal it receives. For example, the power supply 238 may be selected or designed such that control voltage provided to the control input of the power supply of from 0 to 10 volts will inversely adjust the output DC voltage of the power supply from 125 to 110 volts. As will be described in greater detail, the control of the output voltage of the AC-to-CD power supply 238 is an important aspect of the power management system, as it will allow the lighting or other load to be driven by power from the electric utility or from the secondary DC source, such as the storage battery 234, situated at the customer facility.

The DC output voltage from the AC-to-DC power supply 238 is provided to a power isolation and distribution circuit 48 and to a second source of DC power, which, in the preferred form of the invention, is a storage battery 234. More specifically, the positive terminal of the power supply 238 is provided to the input of the power isolation and distribution circuit 248, one output of the power isolation and distribution circuit is provided to the power line 206 connected to the lighting distribution panel 204, and another output of the power isolation and distribution circuit is provided to the positive terminal of the storage battery 234. The negative output of the power supply 238 is provided to the negative output of the storage battery 234 and to the neutral line 208 connected to the lighting distribution panel 4. Connected in this manner, the AC-to-DC power supply 238 will not only provide DC power to the lighting or other load 246 of the customer, but will also charge the storage battery at times of low power demand.

In a preferred form of the present invention, the power isolation and distribution circuit 248 basically consists of a series of three interconnected diodes 250, 252, 254. The first diode 250 has its anode connected to the positive output terminal of the power supply 238, and its cathode connected to the positive terminal of the storage battery 234. The second diode 252 has its anode connected to the positive terminal of the storage battery 234, and its cathode connected to the first output of the power isolation and distribution circuit 248, which output is connected to the power line 206 provided to the lighting distribution panel 204. The third diode 254 has its anode connected to the positive output terminal of the power supply 238, and has its cathode connected to the cathode of the second diode 252 and to the first output of the power isolation and distribution circuit 248.

The diodes of the power isolation and distribution circuit provide isolation between the storage battery 234 and the AC-to-DC power supply 238, and provide a larger "dead band" or buffer region to allow the storage battery to be switched into the circuit, to supply power to the lighting of other load 246, or isolated from the circuit. The diodes 250–254 used in the power isolation and distribution circuit are preferably high power, silicon diodes.

The power isolation and distribution circuit 248, power supply 238 and storage battery 234 work in the following manner. Assuming the storage battery is 124 volts DC, and the output of the AC-to-DC power supply is 125 volts DC, for example, then the first and third diodes 250, 254 are forward biased so that the potential at the first and second outputs of the power proportioning circuit is 124.3 volts each, assuming diode drops of 0.7 volts. The second diode 252 is essentially back biased and not turned on. The DC power supply 238 is supplying current to the lighting or other load 246 as well as to the storage battery 234 to charge the battery. This condition occurs during times when there is no peak power demand.

If, for example, the output of the AC-to-DC power supply decreases to 123 volts, then the first and third diodes 250, 254 of the power isolation and distribution circuit are back biased, and the second diode 252 is forward biased. Under such conditions, the storage battery 234 contributes power to the lighting or other load. This condition occurs during peak power demands. The amount of power contributed by the battery 234 to the load is substantially equal to the amount of power drawn from the utility by the customer, which exceeds the set point threshold, up to the limit of the load.

For example, assume that the customer demand is 750 K watts, the set point threshold is set at 800 K watts, and the lighting load controlled by the power management system of the present invention is 100 K watts. Since the customer demand is below the peak set point threshold, the lighting load of the customer will be entirely powered by the utility through the AC-to-DC converter, and the storage battery 234 is being recharged under these conditions. This can be considered a first mode of operation of the power management system.

Assume now that the customer's demand has increased to 850 K watts, which is 50 K watts over the 800 K watt set point threshold set in the management system. Under such conditions, the lighting load controlled by the system will draw 50 K watts of power from the utility through the AC-to-DC converter 238 and 50 K watts of power from the storage battery. Thus, there is a proportional sharing of power to the load from the utility and the storage battery to provide power to the lighting or other load. This can be considered a second mode of operation of the system.

If customer demand increased to 1000 K watts, which is 200 K watts above the threshold, the lighting load will be powered entirely from the storage battery and not by the utility. This is a third "uninterrupatable" mode of operation of the system.

Preferably, the storage battery 234 is formed from a series connection of ten, 12 volt DC batteries. One form of battery, which is suitable for use, is a sealed, maintenance free lead acid Absolyte™ series of batteries manufactured by GNB, Inc.

The operation of the power management system will now be described. A stochastic or recurrent peak power demand is detected by the power transducer 110. The voltage level of the output signal from the power transducer will increase, and this increase in voltage level will be averaged over a predetermined integration period by the integrator circuit 214. The output signal of the integrator circuit will accordingly also increase in magnitude. If the output signal level of the integrator circuit 214 is greater than the threshold signal level of either set point circuit 228, 232 connected to the system, the comparator or differential amplifier circuit 220 will sense this and provide an appropriate output signal to the AC-to-DC power supply 238 to reduce the power supply output voltage to below the potential of the storage battery 234. Since the battery potential is greater than the power supply voltage, power from the battery 234 will be supplied to the load.

If electric power demand from the utility decreases, a corresponding decrease in the magnitude of the output signals from the power transducer 210 and the integrator circuit 214 will follow. If the output signal from the integrator circuit falls to or below the threshold level set by the set point circuits 228,232, the comparator or differential amplifier circuit 220 will sense this and will provide the appropriate signal to the control input of the switching power supply 238 to increase the output voltage level of the power supply. If the supply's output voltage level is greater than the present or "spot" potential of the storage battery 234, the load will again be fully served by the power supply, and current will also flow to the battery until the battery is fully charged. In this mode, no current will flow from the battery to the load.

Another form of the power management system is shown schematically in FIG. 13. The power transducer 210 is connected to one or more of the customer's utility power lines., as shown in FIG. 12, and has its output connected to the non-inverting input of an operational amplifier 260 configured as a non-inverting buffer amplifier. The output of the buffer amplifier 260 is connected to one side of a differential amplifier circuit including an operational amplifier 240, a first input resistor 243 connected between the buffer amplifier output and the non-inverting input of the operational amplifier 240, and another resistor 245 connected between the non-inverting input of the operational amplifier and ground. The differential amplifier includes another input resistor 244 connected to the inverting input of the operational amplifier 240, a feedback resistor 242 connected between the output and inverting input of the operational amplifier and a feedback capacitor 262 connected in parallel with the feed back resistor. The input resistors 243, 244 are preferably equal in value, as are the feedback resistor 242 and grounded resistor 245, as in the previous embodiment. The feedback capacitor 262 is provided to slow the response time of the differential amplifier.

A manual set point threshold circuit includes a potentiometer 236 having its opposite legs connected between a positive voltage and ground and its wiper provided to the non-inverting input of an operational amplifier 264 configured as a non-inverting buffer amplifier. The output of the buffer amplifier 264 is provided to the other input resistor 244 of the differential amplifier.

The output of the differential amplifier is provided to a voltage-to-current converter. The voltage-to-current converter includes an NPN transistor 266, a base resistor 268 connected between the output of the differential amplifier and the base of the transistor 266, and an emitter resistor 270 and series connected diode 272 which together are connected between the emitter of the transistor and ground. The collector of the transistor 266 is connected to one end of a fixed resistor 274 and one end and the wiper of a multi-turn potentiometer 276, whose other end is connected to ground. The remaining end of the fixed resistor 274 is connected to the adjust input of a series regulator 278, such as Part No. TL783C manufactured by Texas Instruments and to one end of another fixed resistor 280 whose other end is connected to the output (OUT) of the regulator 278.

As in the previous embodiment, the power management system includes an AC-to-DC converter comprising the regulator 278 mentioned previously, a full wave rectifier circuit consisting of two diodes 282, 284 and a conventional pi filter consisting of two by-pass capacitors 290, 292 and a series choke or inductor 294, the filter circuit being connected to the output of the rectifier circuit. The output of the filter circuit is connected to one leg of a fixed resistor 296, whose other leg is connected to the input (IN) of the regulator 278 and to the base of a PNP transistor 298 through a base resistor 100. The emitter of the transistor 298 is connected to the output of the filter circuit, and the collector is connected to the base of an NPN power transistor 102. A suitable power transistor 102, which may be used, is Part No. TIPL762 manufactured by Texas Instruments. Of course, the power transistor is selected in accordance with the power requirements of the system. The collector of the power transistor 102 is connected to the emitter of its driving transistor 298 and to the output of the filter, and the emitter of the transistor 102 is connected to the output of the regulator 278. Transistor 298 and 102 and their associated components form a current booster circuit.

The power management system shown in FIG. 13 further includes an isolation and distribution circuit consisting of three interconnected first, second and third diodes 250, 252, 254 as in the previously described embodiment illustrated by FIG. 12. The output of the regulator 278 is connected to the anodes of first and third diodes 250, 254. The anode of the second diode 252 and cathode of the third diode 254 are connected to the positive terminal of a storage battery 234 used in the power management system, and the cathodes of the second and third diodes 252, 254 are connected to the load 246 which is powered by the system.

The power management system shown in FIG. 13 operates in the following manner. When the power drawn from the utility is such that the output level of the transducer 210 is below the set point threshold level, the transistor 266 of the voltage-to-current converter is non-conducting. This effectively increases the resistance of the lower leg of a resistor divider network defined by resistor 280, comprising the upper leg, and the combination of resistors 274 and the parallel combination of the multi-turn potentiometer 276 and the resistance of the voltage-to-current converter, which comprise the network's lower leg. Under such conditions, the voltage at the anode of the first diode 250 will be greater than the voltage at the anode of the second diode 252, which is the voltage of the storage battery 234. The first diode 250 will be turned on and the second diode 252 will be back biased so that power from the utility through the AC-to-DC converter, i.e., the full wave rectifier circuit, the filter and the current booster circuit, will be provided to the load 246.

When the transducer 210 of the power management system senses an increase in utility power drawn by the customer, the output signal from the buffer amplifier 260 will exceed the magnitude of the output signal of the threshold signal's buffer amplifier 264. In response, the differential amplifier will provide a positive voltage output signal, which will cause the transistor 266 of the voltage-to-current converter to conduct current. This effectively lowers the resistance of the lower leg of the resistor divider network, which in turn decreases the voltage on the anode of the first diode 250. If the voltage on the anode of the first diode 250 decreases to a point where the second diode 252 is forward biased, current will flow from the storage battery 234 to the load. As now less power is drawn from the utility, the output voltage from the power transducer 210 will decrease, which affects the output voltage of the differential amplifier and the current drawn through the collector of the voltage-to-current converter transistor 266. This will change the voltage on the anode of the first diode 250 to a point where there is a proportional sharing of power from the storage battery and from the utility. Thus, the power management system acts as a servo system with feedback and has a self-leveling capability.

As can be seen from the above description, the power management system can be easily implemented in a customer facility with little or no rewiring. Because the main distribution panel 202 is usually connected to a second, lighting distribution panel 204, the interconnection between the two can be broken and connected to the power management system. Also, fluorescent lighting, which may represent approximately 40% of the total load for some utility customers, is a particularly attractive load to work in conjunction with the power management system. The lighting load remains fairly constant throughout the day and, therefore, the power management system parameters may be easily optimized for operating such a load. In addition, many of the electronic ballasts currently, and increasingly, used in fluorescent lighting will function on either direct current (DC) or alternating current (AC). If fluorescent lighting, either electronically ballasted or magnetically ballasted, is to be controlled by the system and powered by AC, this may be accomplished by using an inverter 110 interconnected between the output of the power isolation and distribution circuit 248 (and the negative terminal of the AC-to-DC converter 0.38) and the lighting distribution panel 204, as shown by dashed lines in FIG. 12. Accordingly, fluorescent and other lighting is perfectly suited for operation with the power management system.

Figure 14:
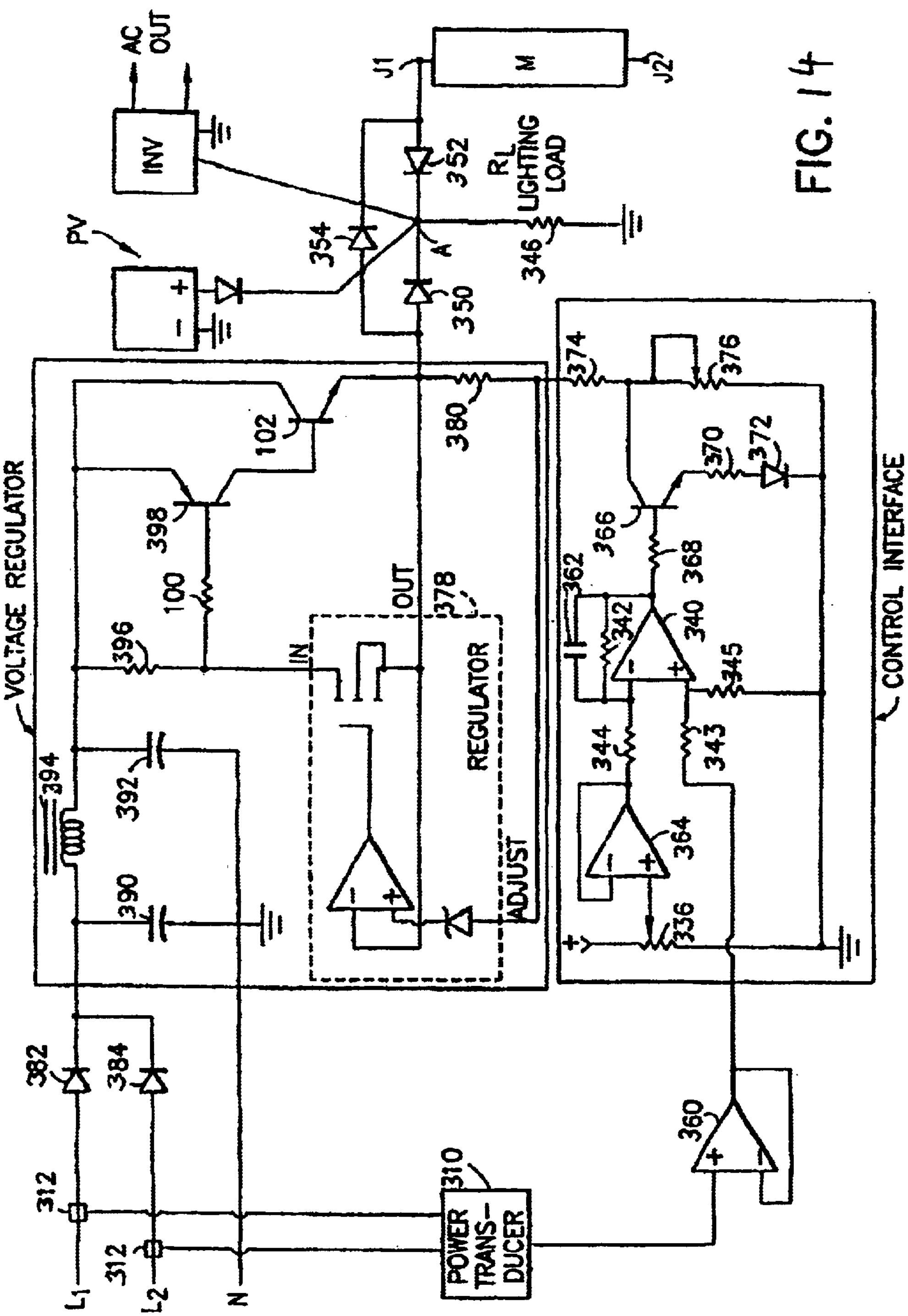
FIG. 14 illustrates the invention with regard to incorporation of the linear voltage regulator and control interface as one means for controlling the charge level of the storage battery.
Figure 15:
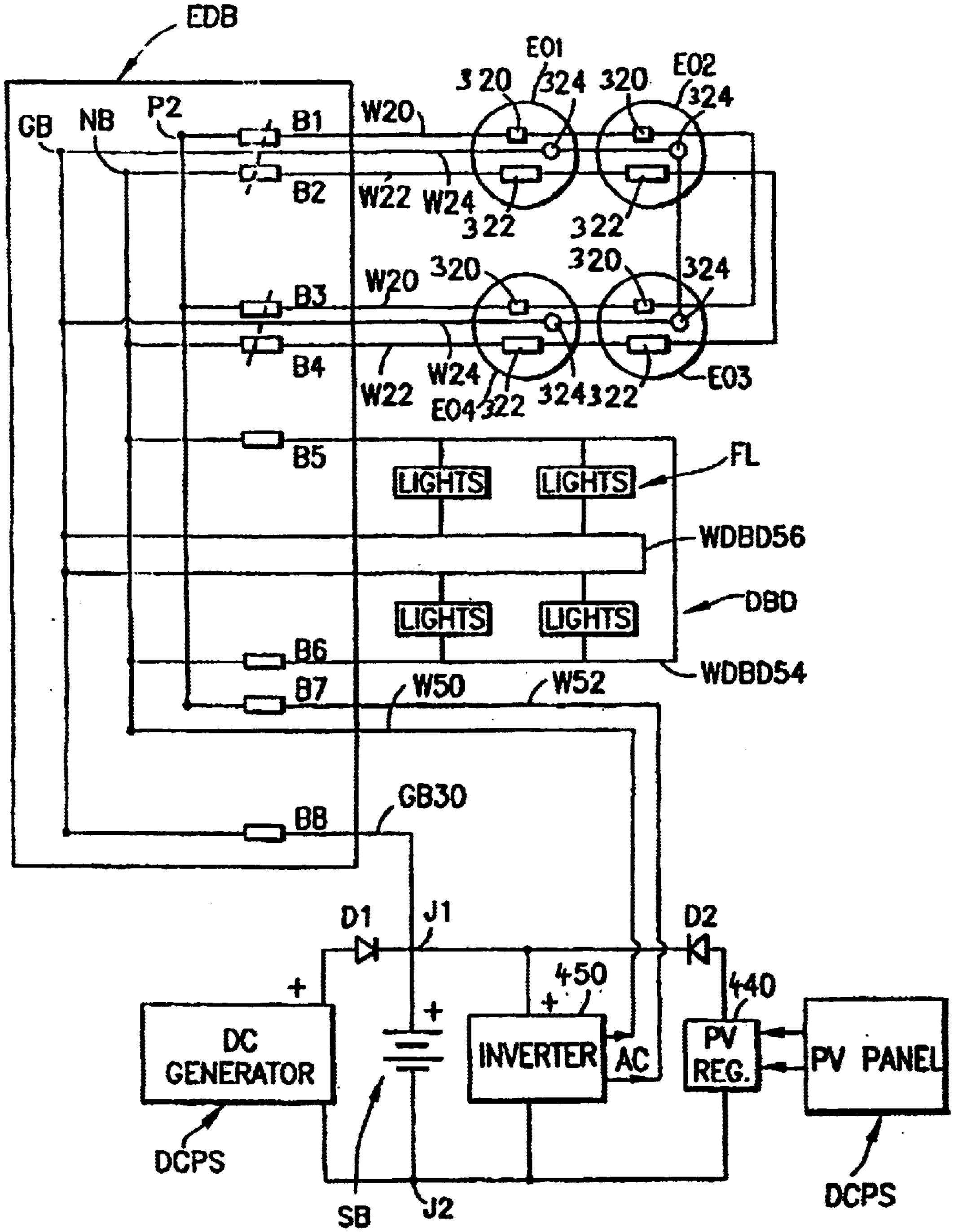
FIG. 15 illustrates the use of circuit breaker means and looping of a DC lighting circuit as well as auxiliary DC equipment and an inverter associated with a simplified illustration of the electric distribution box.

With reference to FIG. 14 note that the circuit shown largely parallels FIG. 13 wherein rectification is effected by the diodes 282 and 284. They feed the TEE circuit 294, 290, 292 of the voltage regulator section (so labeled) operating in conjunction with the control interface (so labeled) to output DC at the junction A. Thus, an important objective is realized, namely, that the charge level of the storage battery means SB to service an intrinsic DC load means such as 346 in FIG. 14 or the electronically (DC) ballasted fluorescent lighting circuit FL in FIG. 15 is maintained at the desired level. Note that the three modes of operation as disclosed in Applicant's U.S. Pat. No. 5,500,561 obtain.

When AC input is present, the voltage regulator function illustrated in FIG. 14 is one means for maintaining the charge level of the storage battery means SB. contained within the module M and which is connected to the junctions J1 and J2. The lighting load 346 is, of course, an intrinsic DC load means such as the looped LIGHTS circuits FL looped between the ground buss GB and the circuit breakers B5 and B6 which are connected to the neutral buss NB as in FIG. 15. The photo-voltaic panel means PV and the inverter means INV are shown in FIG. 14. It will also be understood that although the electric distribution box is not illustrated fully in FIG. 14, this is done for 0.5 simplicity to avoid overcrowding of the Figure.

FIG. 15 shows the electric distribution box EDB in simplified and uncluttered form and is principally directed to illustrating the concept of ganged circuit breakers and of looping of an intrinsic DC load means as well the use of a load source means. The box EDB is outlined and the ground buss GB, the neutral buss NB and the power buss P2 are all designated. The DC ballasted fluorescent lighting intrinsic DC load means FL comprises an example of a distributor box DBD emanating from the box EDB. Each looping WDBD54 and WDBD56 is between the neutral buss NB (−DC) through the circuit breaker means B5 and B6 to the ground buss GB (+DC). Four electrical outlet means E01, E02, E03 and E04 are illustrated, all identical, with the two wirings W20 connected with the power buss P2 through the respective circuit breaker means B1 and B3. Similarly, the two wirings W22 are connected with the neutral buss NB through the respective circuit breaker mans B2 and B4. The circuit breakers B1 and B2 "belong" to an AC path and a DC path, respectively, and the circuit breakers B3 and B4 similarly "belong".

The DC power sources are illustrated as the DC generator and the photo-voltaic panel means PV which, after regulation at the regulator 440, passes through the isolating diode D2 to the junction A to which the positive side of the DC generator DCPS is connected through the isolating diode D1. The junction A is connected to the ground buss GB through the circuit breaker B8 whereas the AC input from the inverter 450 is connected to the neutral buss NB by means of the wiring W50 and to the circuit breaker B7 through the wiring W52. The looping of the intrinsic DC load means effectively doubles the current carrying capacities of the associated wirings whereas the ganging of the AC and DC paths as to circuit breaker means allows the dual voltage aspect to be carried out with increased safety.

To reiterate some of the above, the modular concept of this invention is very important in that it involves the provision of separate entities which are the storage battery means SB and the filter capacitor means FC. The storage battery means SB has a very large battery equivalent capacitance consistent with an excellent AC path to ground and the filter capacitor means FC has a very small capacitance consistent with a limited AC path to ground and being sized in capacitance wherein the capacitive reactance xc is low enough to pass sufficient current to keep both the worst case fault currents well below any shock hazards and to allow sufficient current flow to trip the relevant circuit breaker(s) in the event of an appliance short circuit. As noted, the capacitance of the filter capacitor FC should be in the order of 50 microfarads.

Figure 16:
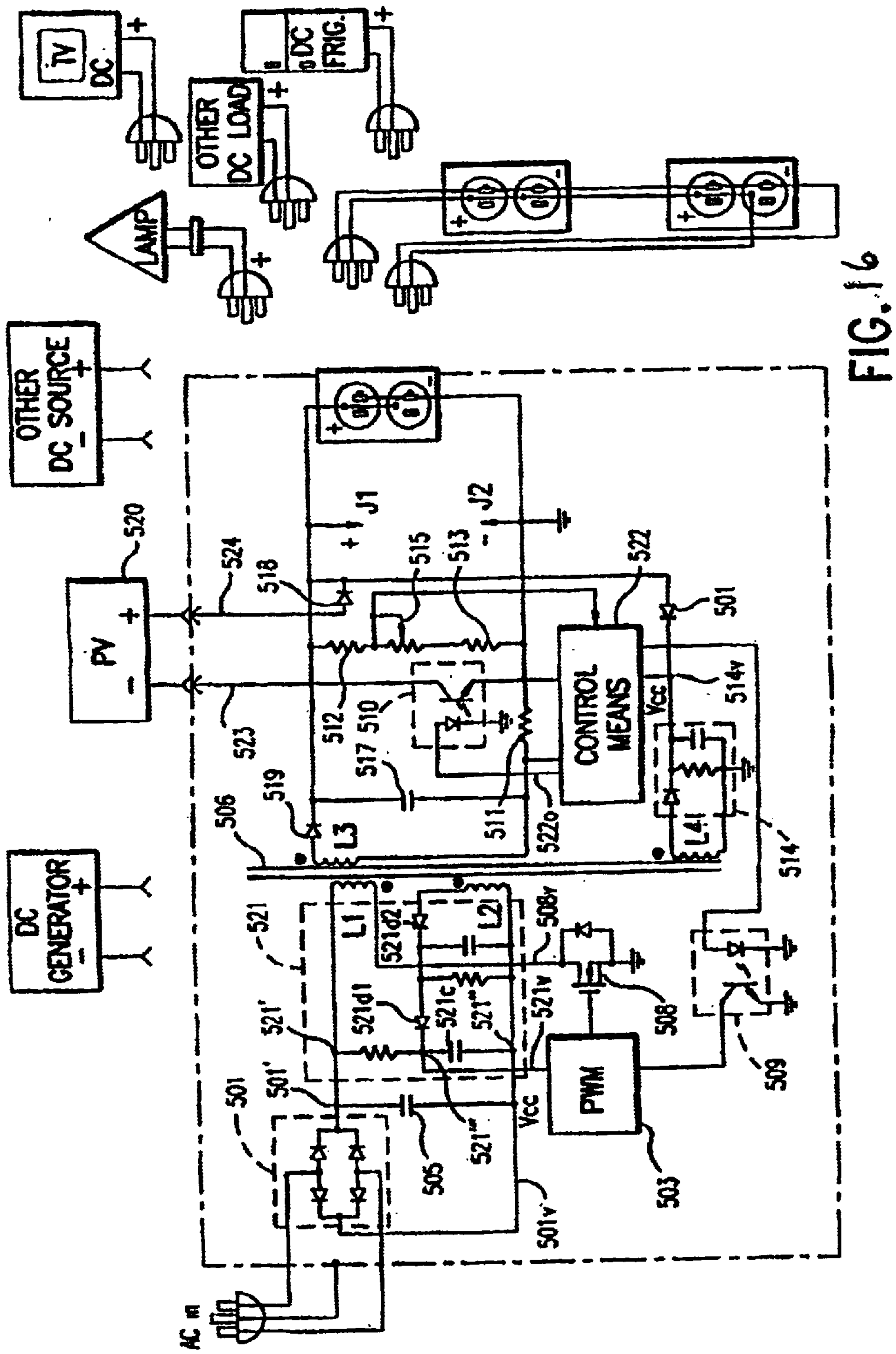
FIG. 16 illustrates a converter fed by a DC supply from a rectifier and providing an output to storage battery means illustrated as having a filter capacitor in electrical parallel therewith.

FIG. 16 is directed to a circuit, which embodies a switching type converter of very high efficiency and is a preferred form of converter because this type of DC-to-DC power supply represents high efficiency contemporaneously possible. FIG. 16 illustrates input mechanisms, some of which are not designated by reference characters but which are designated as to function, and also illustrates output mechanisms, none of which are designated by reference characters but which are designated as to function. In all such cases, the meanings should be clear and the additional descriptive material detailing the mechanisms and reference characters are believed to be unnecessary.

The block enclosed in dashed lines and designated by the reference character 501 is a typical full wave rectifier bridge circuit (i.e., the opposite of an inverter) feeding the capacitor 505 at the junction 501' and whose purpose is to reduce the rectified ripple component of the circuit 501 and to provide filtered DC input voltage, present between the junction 501' and the conductor 501*v* to the converter means.

The converter circuit shown, downstream of and as fed by filtered DC from the rectifier circuit 501 has junctions 521' and 521" within the section 521 between which the resistor/capacitor pair 521*r* and 521*c* are connected and which pair provide the further junction 521'". The junction 521'" is connected to the conductor 521*v* which supplies the pulse width modulator 503 with positive voltage Vcc, and this junction feeds the diode 521*d*1 having junctions with the parallel resistor/capacitor pair which are connected between the diode 521*d*2 and the junction 521".

The converter employs a pulse width modulator PWM, indicated at 503, controlling the switching transistor circuit 508 to impress transient voltage spikes present on the conductor 508*v* through the primary of the transformer 506 to cycle current to the primary windings L1 and L2 of the transformer 506 whereby "ac is generated as an intermediate process in the flow of energy" as is defined in the above definition of "converter". The secondary side of the transformer 506 is represented by the windings L3 and L4.

The circuit 509 is an optical isolation link between the pulse width modulator 503 and the control means 522 on the secondary side of the transformer 506 which allows control voltage on the conductor 509*v* emanating from the pulse width modulator 503 on the primary side of the transformer 506 to provide an input to the control means 522 on the secondary side to influence the pulse width modulator PWM 503 without current leakage back from the secondary circuit. Typically, the frequency of conversion effected by the transformer 506 will be 20,000–100,000 Hz, which dictates the need for the special capacitor 517 to absorb these transients, the capacitance of the capacitor 517 being typically about 1 microfarad when used.

A secondary winding L4 drives the circuit 514 which, similarly t6 the rectifier 501 plus the filtering of the capacitor 505, provides a DC output, in this case the proper DC input to the control means 522 at the conductor 514*v*. The control means 522 has an output conductor 522*o* connected to the optical link 510 for controlling the three modes of operation of voltage control in accord with the principles of my prior applications. That is to say, when the optical isolator 510 link is "on", modes which permit DC current to flow from the photovoltaic means 520 are operative, i.e., either or both DC power input from the means 520 alone and partial or shared DC power input from the means 520. When the optical isolator 510 link is "off", the remaining mode, DC power input solely from another source (i.e., no photovoltaic input) is effected.

The modes are controlled by the DC voltage prevailing across the junctions J1 and J2 (or the presence of a rechargeable DC mechanism such as a storage battery means connected to these junctions) in which case, mode 1, DC power input to the rechargeable DC mechanism alone, mode 2, shared DC power input, and mode 3 no DC power input to the rechargeable DC mechanism are the order of the day. That is to say, when the conductors 523 and 524 are connected to one of the DC sources illustrated in FIG. 16, or to a DC power source such as DCPS in FIG. 15, the system will be fully operative for the purposes intended.

Stated another way, the DC voltage applied to the storage means will depend upon the feedback influenced by the resistors 336, 342, 343, 344, 345, 368, 370, 374 and 376 in FIG. 14 or by the resistors including 511, 512, 513 and 515 in FIG. 16.

This is true even if the system according to this invention is operated on the barest of input. For example, in locations where either AC or DC power is available only part of the time, or is available on site only from mechanism thereat, some configuration disclosed in the drawing Figures herein will be effective to provide DC power supply to the storage battery means. This, therefore, constitutes a universal power system.

Other modifications may be made to the present invention without departing from the scope of the invention, as noted in the appended claims.

I claim:

1. A power sharing system in a DC load environment comprising:

a primary source of AC;

an alternative primary source of DC;

a secondary source of DC;

a power controller capable of inputting voltage regulated DC power simultaneously from said primary sources, said alternative primary source of DC making a shared contribution of power selected by said power controller, and having a power junction means for delivering a regulated voltage DC to at least one DC compatible load at an output of said power sharing system;

said power controller controlling supply side power sharing at to a DC load side;

said power controller having a converter converting AC inputted electrical power into a defined DC-regulated voltage to provide and manage power to said DC compatible load;

said power controller producing outputting voltage regulated power controlling response of said alternative primary source of DC power;

said secondary source of DC being a storage battery to supply power in the event of a failure in a primary source of power, said power controller charging and maintaining said battery in a state of charge, and, said power controller capable of altering the output voltage of said power junction means for directing power from said secondary sources of DC power to limit peak power supplied from said primary source of AC power to said at least one DC compatible load in accordance with a pre-set threshold of power from said primary source of AC power in order to minimize peak power surcharges.

2. The power system of claim 1 wherein said DC compatible load is a lighting system.

3. The power system of claim 1 wherein said alternative primary source of DC power is an energy storage medium.

4. The power system of claim 1 wherein said alternative primary source of DC is a photo voltaic energy source.

5. The power system of claim 1 wherein said alternative primary source of DC is a cogenerator.

6. The power system of claim 1 wherein said alternative primary source of DC is a wind energy electric energy conversion system.

7. The power system as in claim 1 in which said power controller contains circuitry for combining power from said alternative primary source of DC and said battery in the absence of power from mid primary source of AC.

8. A power control for use in a high efficiency lighting system for maintaining normal lighting conditions through lighting fixtures requiring DC electrical power comprising:

an AC connection for receiving AC electrical power from a grid source and an output connection for delivering required DC electrical power to said lighting fixtures;

a power controller capable of converting and outputting voltage regulated DC power simultaneously from said AC primary source, said alternative sources of DC energy making a shared contribution of power selected by said power controller, said differential voltage shared among said power sources influencing an amount of energy coming from each respective source directed to at least one DC load; said power controller having a power junction means for delivering a consent voltage DC to at least one DC compatible load at an output of said power sharing system;

said power controller voltage influencing the proportion of coming from multiple sources to each said DC;

a converter converting said AC electrical power to DC electrical power;

a connection for a storage battery to provide standby energy to the DC load and, said battery being connected to said AC and DC converter for maintaining said connected storage battery at a desired state of charge and its discharge, when AC power is connected to the AC connection during normal supply of AC electrical power from said grid source; and said power controller delivering said required DC electrical power from said battery means to said lighting fixtures during an AC electrical power outage to maintain without interruption normal lighting by said lighting fixtures.

* * * * *